US009659741B2

(12) United States Patent
Canfield et al.

(10) Patent No.: US 9,659,741 B2
(45) Date of Patent: May 23, 2017

(54) X-RAY TUBE HAVING PLANAR EMITTER WITH TUNABLE EMISSION CHARACTERISTICS

(71) Applicant: VARIAN MEDICAL SYSTEMS, INC., Palo Alto, CA (US)

(72) Inventors: Bradley D. Canfield, Orem, UT (US); Colton B. Woodman, West Valley City, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 115 days.

(21) Appl. No.: 14/660,607

(22) Filed: Mar. 17, 2015

(65) Prior Publication Data

US 2015/0187530 A1 Jul. 2, 2015

Related U.S. Application Data

(63) Continuation-in-part of application No. PCT/US2014/063015, filed on Oct. 29, 2014.

(Continued)

(51) Int. Cl.
*H01J 1/304* (2006.01)
*H01J 35/14* (2006.01)

(Continued)

(52) U.S. Cl.
CPC .............. *H01J 35/14* (2013.01); *G06F 17/50* (2013.01); *H01J 1/304* (2013.01); *H01J 9/025* (2013.01);

(Continued)

(58) Field of Classification Search
None
See application file for complete search history.

(56) References Cited

U.S. PATENT DOCUMENTS 6,464,551 B1 10/2002 Lipkin et al.
6,646,366 B2 11/2003 Hell et al.

(Continued)

FOREIGN PATENT DOCUMENTS

WO 2012/167822 A1 12/2012

OTHER PUBLICATIONS

International Search Report and Written Opinion; PCT/US2014/063015.

*Primary Examiner* — Douglas W Owens
*Assistant Examiner* — Srinivas Sathiraju
(74) *Attorney, Agent, or Firm* — Maschoff Brennan

(57) ABSTRACT

An electron emitter can include: a plurality of elongate rungs connected together end to end from a first emitter end to a second emitter end in a plane so as to form a planar pattern; a plurality of corners, wherein each elongate rung is connected to another elongate rung through a corner having a corner apex and an opposite corner nadir; a first gap between adjacent non-connected elongate rungs, wherein the first gap extends from the first emitter end to a middle rung; a second gap between adjacent non-connected elongate rungs, wherein the second gap extends from the second emitter end to the middle rung, wherein the first gap does not intersect the second gap; and one or more cutouts at one or more of the corners of the plurality of corners between the corner apex and corner nadir or at the corner nadir.

12 Claims, 13 Drawing Sheets

Related U.S. Application Data

(60) Provisional application No. 61/897,181, filed on Oct. 29, 2013.

(51) Int. Cl.

| | |
|---|---|
| ***H01J 35/06*** | (2006.01) |
| ***H05G 1/10*** | (2006.01) |
| ***G06F 17/50*** | (2006.01) |
| ***H01J 9/02*** | (2006.01) |
| ***H01J 35/30*** | (2006.01) |

(52) U.S. Cl.

CPC ............ *H01J 35/06* (2013.01); *H01J 35/065* (2013.01); *H01J 35/305* (2013.01); *H05G 1/10* (2013.01)

(56) References Cited

U.S. PATENT DOCUMENTS

| | | | | | |
|---|---|---|---|---|---|
| 7,839,979 | B2 | 11/2010 | Hauttmann et al. | | |
| 7,924,983 | B2 * | 4/2011 | Moore | H01J 1/15 | 378/122 |
| 8,077,829 | B2 * | 12/2011 | Moore | H01J 1/20 | 378/136 |
| 9,048,064 | B2 * | 6/2015 | Boye | H01J 35/14 | |
| 2002/0006489 | A1 * | 1/2002 | Goth | B82Y 10/00 | 428/36.9 |
| 2002/0193036 | A1 * | 12/2002 | Benning | B82Y 10/00 | 445/24 |
| 2003/0025429 | A1 | 2/2003 | Hell et al. | | |
| 2006/0050852 | A1 * | 3/2006 | Andrews | F04D 29/588 | 378/141 |
| 2006/0067478 | A1 * | 3/2006 | Canfield | H05G 1/04 | 378/141 |
| 2007/0291903 | A1 * | 12/2007 | Canfield | H01J 35/165 | 378/194 |
| 2010/0195797 | A1 | 8/2010 | Hauttmann | | |
| 2010/0207508 | A1 | 8/2010 | Terletska et al. | | |
| 2010/0316192 | A1 | 12/2010 | Hauttmann et al. | | |
| 2012/0027182 | A1 * | 2/2012 | Canfield | H01J 35/06 | 378/136 |
| 2014/0254767 | A1 * | 9/2014 | Boye | H01J 35/14 | 378/136 |
| 2015/0187536 | A1 * | 7/2015 | Canfield | H01J 35/06 | 378/137 |
| 2015/0187537 | A1 * | 7/2015 | Canfield | H01J 35/06 | 378/113 |
| 2015/0187538 | A1 * | 7/2015 | Canfield | H01J 35/06 | 378/113 |
| 2015/0296574 | A1 * | 10/2015 | Knoedgen | H05B 33/08 | 315/307 |

* cited by examiner

X-RAY TUBE HAVING PLANAR EMITTER WITH TUNABLE EMISSION CHARACTERISTICS

CROSS-REFERENCE

This patent application is a continuation-in-part application of PCT Patent Application Serial No. PCT/US2014/063015 filed Oct. 29, 2014, which claims priority to U.S. Provisional Application Ser. No. 61/897,181 filed Oct. 29, 2013, which patent applications are incorporated herein by specific reference in their entireties.

BACKGROUND

X-ray tubes are used in a variety of industrial and medical applications. For example, X-ray tubes are employed in medical diagnostic examination, therapeutic radiology, semiconductor fabrication, and material analysis. Regardless of the application, most X-ray tubes operate in a similar fashion. X-rays, which are high frequency electromagnetic radiation, are produced in X-ray tubes by applying an electrical current to a cathode to cause electrons to be emitted from the cathode by thermionic emission. The electrons accelerate towards and then impinge upon an anode. The distance between the cathode and the anode is generally known as A-C spacing or throw distance. When the electrons impinge upon the anode, the electrons can collide with the anode to produce X-rays. The area on the anode in which the electrons collide is generally known as a focal spot.

X-rays can be produced through at least two mechanisms that can occur during the collision of the electrons with the anode. A first X-ray producing mechanism is referred to as X-ray fluorescence or characteristic X-ray generation. X-ray fluorescence occurs when an electron colliding with material of the anode has sufficient energy to knock an orbital electron of the anode out of an inner electron shell. Other electrons of the anode in outer electron shells fill the vacancy left in the inner electron shell. As a result of the electron of the anode moving from the outer electron shell to the inner electron shell, X-rays of a particular frequency are produced. A second X-ray producing mechanism is referred to as Bremsstrahlung. In Bremsstrahlung, electrons emitted from the cathode decelerate when deflected by nuclei of the anode. The decelerating electrons lose kinetic energy and thereby produce X-rays. The X-rays produced in Bremsstrahlung have a spectrum of frequencies. The X-rays produced through either Bremsstrahlung or X-ray fluorescence may then exit the X-ray tube to be utilized in one or more of the above-mentioned applications.

In certain applications, it may be beneficial to lengthen the throw length of an X-ray tube. The throw length is the distance from cathode electron emitter to the anode surface. For example, a long throw length may result in decreased back ion bombardment and evaporation of anode materials back onto the cathode. While X-ray tubes with long throw lengths may be beneficial in certain applications, a long throw length can also present difficulties. For example, as a throw length is lengthened, the electrons that accelerate towards an anode through the throw length tend to become less laminar resulting in an unacceptable focal spot on the anode. Also affected is the ability to properly focus and/or position the electron beam towards the anode target, again resulting in a less than desirable focal spot—either in terms of size, shape and/or position. When a focal spot is unacceptable, it may be difficult to produce useful X-ray images.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments address these and other problems by improving X-ray image quality via improved electron emission characteristics, and/or by providing improved control of a focal spot size and position on an anode target. This helps to increase spatial resolution or to reduce artifacts in resulting images.

In one embodiment, an electron emitter can include: a plurality of elongate rungs connected together end to end from a first emitter end to a second emitter end in a plane so as to form a planar pattern, each elongate rung having a rung width dimension; a plurality of corners, wherein each elongate rung is connected to another elongate rung through a corner of the plurality of corners, each corner having a corner apex and an opposite corner nadir between the connected elongate rungs of the plurality of elongate rungs; a first gap between adjacent non-connected elongate rungs of the plurality of elongate rungs, wherein the first gap extends from the first emitter end to a middle rung; a second gap between adjacent non-connected elongate rungs of the plurality of elongate rungs, wherein the second gap extends from the second emitter end to the middle rung, wherein the first gap does not intersect the second gap; and one or more cutouts at one or more of the corners of the plurality of corners between the corner apex and corner nadir or at the corner nadir.

In one embodiment, a method of designing an electron emitter can include: determining a desired cross-sectional profile of an electron emission from an electron emitter, where the parameters of the electron emitter can be input into a computer; determining a desired temperature profile for the electron emitter that emits the desired cross-sectional profile; and determining desired emitter dimensions for a defined electrical current through the electron emitter that produces the desired temperature profile, which can be determined through simulations run on the computer under instructions input by the user. The emitter dimensions can include: each rung width dimension; each first gap segment dimension; each second gap segment dimension; and each web dimension. The electron emitter can include: a plurality of elongate rungs connected together end to end at corners, each corner having a corner apex and an opposite corner nadir, each elongate rung having a rung width dimension; a first gap between adjacent non-connected elongate rungs from the first emitter end to a middle rung, the first gap including a plurality of first gap segments each having a first gap segment width; a second gap between adjacent non-connected elongate rungs from the second emitter end to the middle rung, the second gap including a plurality of second gap segments each having a second gap segment width; and one or more body portions of each corner between the corner apex and corner nadir together define a web dimension for each corner.

In one embodiment, a method of manufacturing an electron emitter can include: obtaining a sheet of electron emitter material; obtaining an electron emitter pattern; and laser cutting the electron emitter pattern into the electron emitter material. The electron emitter pattern can include: a plurality of elongate rungs connected together end to end from a first emitter end to a second emitter end in a plane so as to form a planar pattern, each elongate rung having a rung width dimension; a plurality of corners, wherein each elongate rung is connected to another elongate rung through a corner of the plurality of corners, each corner having a corner apex and an opposite corner nadir between the connected elongate rungs of the plurality of elongate rungs; a first gap between adjacent non-connected elongate rungs of the plurality of elongate rungs, wherein the first gap extends from the first emitter end to a middle rung; a second gap between adjacent non-connected elongate rungs of the plurality of elongate rungs, wherein the second gap extends from the second emitter end to the middle rung, wherein the first gap does not intersect the second gap; and one or more cutouts at one or more of the corners of the plurality of corners between the corner apex and corner nadir or at the corner nadir. In one aspect, the method can further include determining that the electron emitter pattern produces a desired temperature profile for a defined electrical current.

Certain embodiments include a magnetic system implemented as two magnetic quadrupoles disposed in the electron beam path of an X-ray tube. The quadrupoles are configured to focus in both directions perpendicular to the beam path, and to steer the beam in both directions perpendicular to the beam path. The two quadrupoles form a magnetic lens (sometimes referred to as a “doublet”) and the focusing is accomplished as the beam passes through the quadrupole lens. The steering is accomplished by offsetting the coil current in corresponding pairs of the quadrupole while maintaining the focusing coil current which results in an overall shift in the quadrupole’s magnetic field. Steering of the beam occurs through appropriate coil pair energizing and can be done in one axis or a combination of axes. In one example, one quadrupole is used to focus in the first direction and the second quadrupole to focus in the second direction as well as steer in both directions. The two quadrupoles together form the quadrupole lens.

Certain embodiments include a magnetic system implemented as two magnetic quadrupoles and two dipoles disposed in the electron beam path of an X-ray tube. The steering is accomplished by the two dipoles which are created by coils wound on one of the core’s protrusions (poles) while the quadrupole coils (wound on the same protrusions/poles) maintain the focusing coil current which results in an overall shift in the magnetic field. Steering of the beam occurs through appropriate coil pair energizing and can be done in one axis or a combination of axes. In one embodiment, one quadrupole is used to focus in the first direction and the second quadrupole with two dipoles to focus in the second. The two quadrupoles together form the quadrupole lens.

In yet another embodiment, an electron source is provided in the form of a flat emitter for the production of electrons. The emitter has a relatively large emitting area with design features that can be tuned to produce the desired distribution of electrons to form a primarily laminar beam. The emission over the emitter surface is not uniform or homogenous; it is tuned to meet the needs of a given application. As the beam flows from the cathode to the anode, the electron density of the beam spreads the beam apart significantly during transit. The increased beam current levels created by higher power requirements exacerbate the spreading of the beam during transit. In disclosed embodiments, to achieve the focal spot sizes required, the beam is focused by two quadrupoles as it transits from the cathode to the anode. This also provides for creating a multiplicity of sizes from a single emitter; the size conceivably could be changed during an exam as well. The increased emitter area of the flat geometry of the emitter allows production of sufficient electrons flowing laminarly to meet the power requirements. To address the requirement of steering the beam in two dimensions so as to provide the desired imaging enhancements, a pair of dipoles is used to deflect the beam to the desired positions at the desired time. One dipole set is provided for each direction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1A:
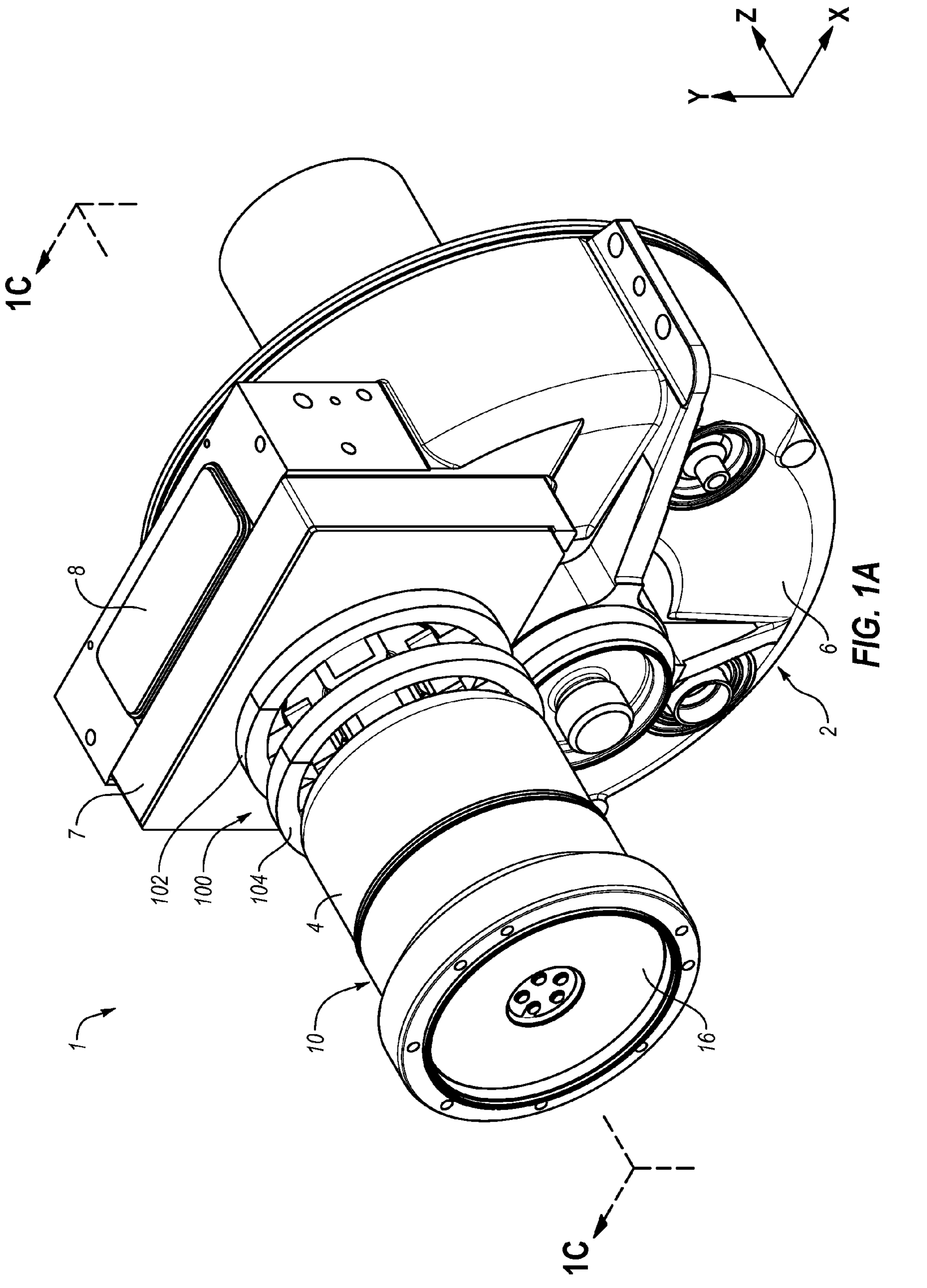
FIG. 1A is a perspective view of an example X-ray tube in which one or more embodiments described herein may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. General Overview of an Exemplary X-ray Tube

Embodiments of the present technology are directed to X-ray tubes of the type having a vacuum housing in which a cathode and an anode are arranged. The cathode includes an electron emitter that emits electrons in the form of an electron beam that is substantially perpendicular to a face of the emitter, and the electrons are accelerated due a voltage difference between the cathode and the anode so as to strike a target surface on the anode in an electron region referred to as a focal spot. Embodiments can also include an electron beam focusing and/or steering component that is configured to manipulate the electron beam by: (1) deflecting, or steering, the electron beam, and thereby altering the position of the focal spot on the anode target; and/or (2) focusing the electron beam so as to alter the dimensions of the focal spot. Different embodiments utilize different configurations of such focusing and/or steering components, such as magnet systems, including combinations of electromagnets formed as quadrupoles and/or as dipoles via coil elements with current flowing therein and disposed on a carrier/yoke comprised of a suitable material.

Figure 1B:
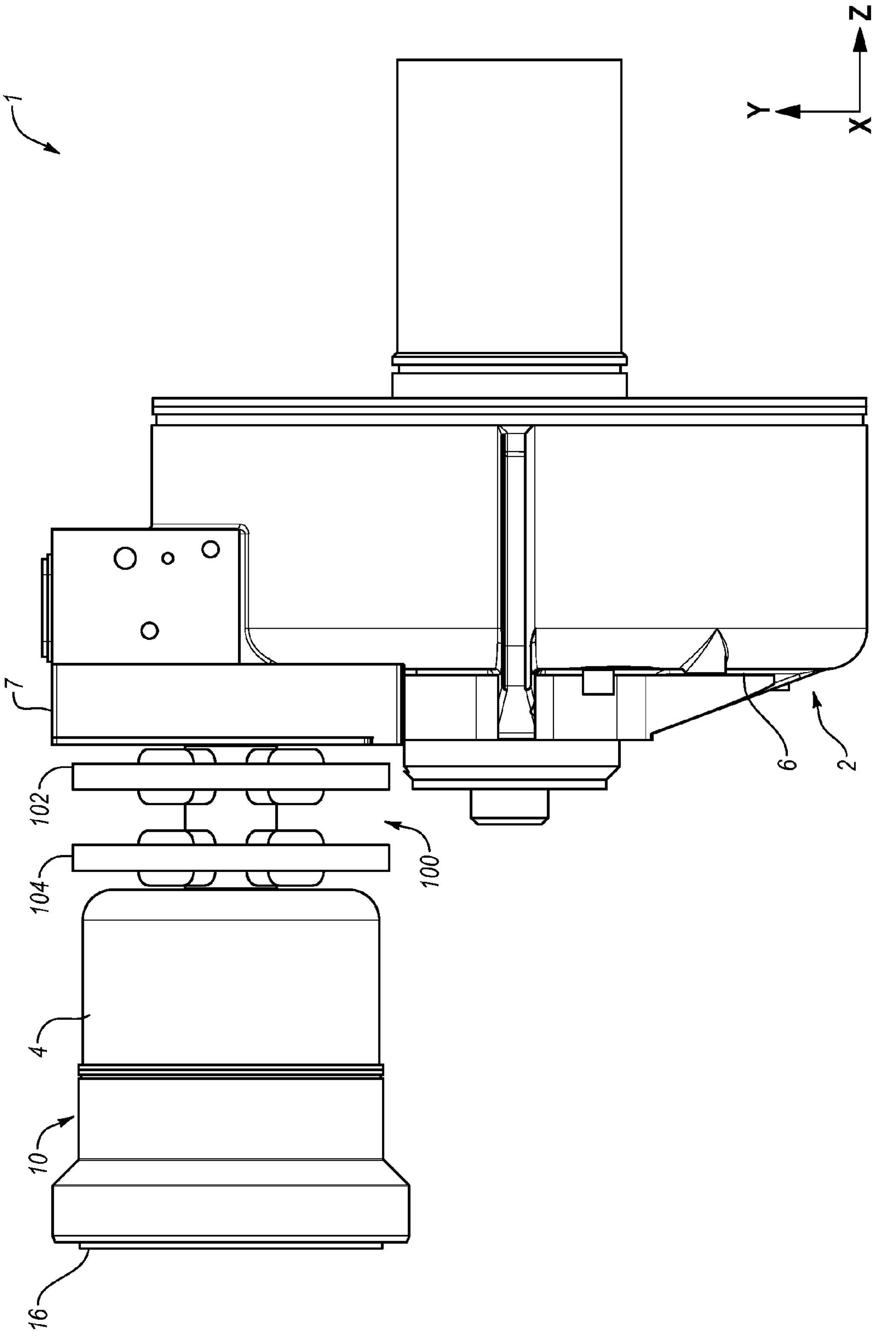
FIG. 1B is a side view of the X-ray tube of FIG. 1A.
Figure 1C:
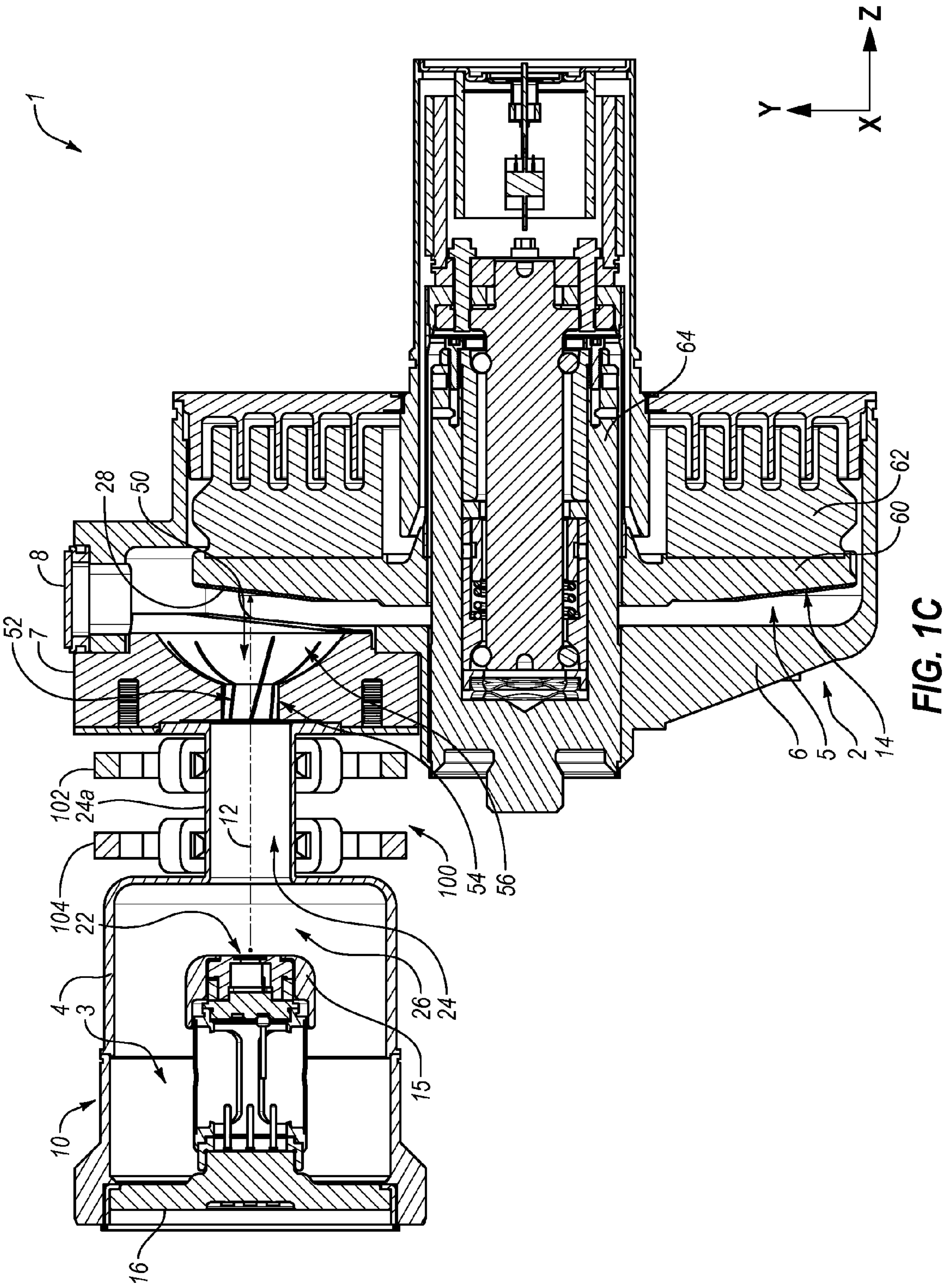
FIG. 1C is a cross-sectional view of the X-ray tube of FIG. 1A.

Disclosed embodiments illustrate an electron emitter having a planar electron emitter structure. Moreover, the planer emitter is designed and configured to provide tunable emission characteristics for the emitted electron beam, which results in the ability to tailor—and thus optimize—the focal spot size, shape and position for a given imaging application. The tailoring of the planar electron emitter pattern can result in an enhanced emitter configuration that avoids image quality issues due to a less-than-optimal focal spot. For example, an increase in spatial resolution and reduction in image artifacts is possible with the designed planer electron emitter patterns. One example of an X-ray tube have certain of these features—discussed in further detail below—is shown in FIGS. 1A-1C. However, the planar emitter described herein can be used in various X-ray tube embodiments, such as those with or without beam focusing and/or steering.

In general, example embodiments described herein relate to a cathode assembly with a planar electron emitter that can be used in substantially any X-ray tube, such as for example in long throw length X-ray tubes. In at least some of the example embodiments disclosed herein, the difficulties associated with a long throw length of an X-ray tube can be overcome by employing a planar electron emitter having a planar emitting surface. In a disclosed embodiment, the planar emitting surface can be formed by a continuous and cutout shaped planar member with a substantially flat emitting surface that extends between two electrodes. The continuous flat emitting surface can have a plurality of sections connected together at bends or elbows that are defined by the cutout. When a suitable electrical current is passed through the emitter, the planar emitting surface emits electrons that form an electron beam that is substantially laminar as it propagates through an acceleration region and a drift region (e.g., with or without magnetic steering or focusing) to impinge upon a target surface of an anode at a focal spot.

FIGS. 1A-1C are views of one example of an X-ray tube 1 in which one or more embodiments described herein may be implemented. Specifically, FIG. 1A depicts a perspective view of the X-ray tube 1 and FIG. 1B depicts a side view of the X-ray tube 1, while FIG. 1C depicts a cross-sectional view of the X-ray tube 1. The X-ray tube 1 illustrated in FIGS. 1A-1C represents an example operating environment and is not meant to limit the embodiments described herein.

Generally, X-rays are generated within the X-ray tube 1, some of which then exit the X-ray tube 1 to be utilized in one or more applications. The X-ray tube 1 may include a vacuum enclosure structure 2 which may act as the outer structure of the X-ray tube 1. The vacuum structure 2 may include a cathode housing 4 and an anode housing 6. The cathode housing 4 may be secured to the anode housing 6 such that an interior cathode volume 3 is defined by the cathode housing 4 and an interior anode volume 5 is defined by the anode housing 6, each of which are joined so as to define the vacuum enclosure 2.

In some embodiments, the vacuum enclosure 2 is disposed within an outer housing (not shown) within which a coolant, such as liquid or air, is circulated so as to dissipate heat from the external surfaces of the vacuum enclosure 2. An external heat exchanger (not shown) is operatively connected so as to remove heat from the coolant and recirculate it within the outer housing.

The X-ray tube 1 depicted in FIGS. 1A-1C includes a shield component (sometimes referred to as an electron shield, aperture, or electron collector) 7 that is positioned between the anode housing 6 and the cathode housing 4 so as to further define the vacuum enclosure 2. The cathode housing 4 and the anode housing 6 may each be welded, brazed, or otherwise mechanically coupled to the shield 7. While other configurations can be used, examples of suitable shield implementations are further described in U.S. patent application Ser. No. 13/328,861 filed Dec. 16, 2011 and entitled "X-ray Tube Aperture Having Expansion Joints," and U.S. Pat. No. 7,289,603 entitled "Shield Structure And Focal Spot Control Assembly For X-ray Device," the contents of each of which are incorporated herein by reference for all purposes.

The X-ray tube 1 may also include an X-ray transmissive window 8. Some of the X-rays that are generated in the X-ray tube 1 may exit through the window 8. The window 8 may be composed of beryllium or another suitable X-ray transmissive material.

With specific reference to FIG. 1C, the cathode housing 4 forms a portion of the X-ray tube referred to as a cathode assembly 10. The cathode assembly 10 generally includes components that relate to the generation of electrons that together form an electron beam, denoted at 12. The cathode assembly 10 may also include the components of the X-ray tube between an end 16 of the cathode housing 4 and an anode 14. For example, the cathode assembly 10 may include a cathode head 15 having an electron emitter, generally denoted at 22, disposed at an end of the cathode head 15. As will be further described, in disclosed embodiments the electron emitter 22 is configured as a planar electron emitter. When an electrical current is applied to the electron emitter 22, the electron emitter 22 is configured to emit electrons via thermionic emission, that together form a laminar electron beam 12 that accelerates towards the anode target 28.

The cathode assembly 10 may additionally include an acceleration region 26 further defined by the cathode housing 4 and adjacent to the electron emitter 22. The electrons emitted by the electron emitter 22 form an electron beam 12 and enter traverse through the acceleration region 26 and accelerate towards the anode 14 due to a suitable voltage differential. More specifically, according to the arbitrarily-defined coordinate system included in FIGS. 1A-1C, the electron beam 12 may accelerate in a z-direction, away from the electron emitter 22 in a direction through the acceleration region 26.

The cathode assembly 10 may additionally include at least part of a drift region 24 defined by a neck portion 24*a* of the cathode housing 4. In this and other embodiments, the drift region 24 may also be in communication with an aperture 50 provided by the shield 7, thereby allowing the electron beam 12 emitted by the electron emitter 22 to propagate through the acceleration region 26, the drift region 24 and aperture 50 until striking the anode target surface 28. In the drift region 24, a rate of acceleration of the electron beam 12 may be reduced from the rate of acceleration in the acceleration region 26. As used herein, the term "drift" describes the propagation of the electrons in the form of the electron beam 12 through the drift region 24.

Positioned within the anode interior volume 5 defined by the anode housing 6 is the anode 14, denoted generally at 14. The anode 14 is spaced apart from and opposite to the cathode assembly 10 at a terminal end of the drift region 24. Generally, the anode 14 may be at least partially composed of a thermally conductive material or substrate, denoted at 60. For example, the conductive material may include tungsten or molybdenum alloy. The backside of the anode substrate 60 may include additional thermally conductive material, such as a graphite backing, denoted by way of example here at 62.

The anode 14 may be configured to rotate via a rotatably mounted shaft, denoted here as 64, which rotates via an inductively induced rotational force on a rotor assembly via ball bearings, liquid metal bearings or other suitable structure. As the electron beam 12 is emitted from the electron emitter 22, electrons impinge upon a target surface 28 of the anode 14. The target surface 28 is shaped as a ring around the rotating anode 14. The location in which the electron beam 12 impinges on the target surface 28 is known as a focal spot (not shown). Some additional details of the focal spot are discussed below. The target surface 28 may be composed of tungsten or a similar material having a high atomic ("high Z") number. A material with a high atomic number may be used for the target surface 28 so that the material will correspondingly include electrons in "high" electron shells that may interact with the impinging electrons to generate X-rays in a manner that is well known.

During operation of the X-ray tube 1, the anode 14 and the electron emitter 22 are connected in an electrical circuit. The electrical circuit allows the application of a high voltage potential between the anode 14 and the electron emitter 22. Additionally, the electron emitter 22 is connected to a power source such that an electrical current is passed through the electron emitter 22 to cause electrons to be generated by thermionic emission. The application of a high voltage differential between the anode 14 and the electron emitter 22 causes the emitted electrons to form an electron beam 12 that accelerates through the acceleration region 26 and the drift region 24 towards the target surface 28. Specifically, the high voltage differential causes the electron beam 12 to accelerate through the acceleration region 26 and then drift through the drift region 24. As the electrons within the electron beam 12 accelerate, the electron beam 12 gains kinetic energy. Upon striking the target surface 28, some of this kinetic energy is converted into electromagnetic radiation having a high frequency, i.e., X-rays. The target surface 28 is oriented with respect to the window 8 such that the X-rays are directed towards the window 8. At least some portion of the X-rays then exit the X-ray tube 1 via the window 8.

Optionally, one or more electron beam manipulation components can be provided. Such devices can be implemented so as to "steer" and/or "deflect" the electron beam 12 as it traverses the region 24, thereby manipulating or "toggling" the position of the focal spot on the target surface 28. Additionally or alternatively, a manipulation component can be used to alter or "focus" the cross-sectional shape of the electron beam and thereby change the shape of the focal spot on the target surface 28. In the illustrated embodiments electron beam focusing and steering are provided by way of a magnetic system denoted generally at 100.

The magnetic system 100 can include various combinations of quadrupole and dipole implementations that are disposed so as to impose magnetic forces on the electron beam so as to steer and/or focus the beam. One example of the magnetic system 100 is shown in FIGS. 1A-1E, and 2A. In this embodiment, the magnetic system 100 is implemented as two magnetic quadrupoles and two magnetic dipoles disposed in the electron beam path 12 of the X-ray tube. The two quadrupoles and two dipoles are configured to (a) focus in both directions perpendicular to the beam path, and (b) to steer the beam in both directions perpendicular to the beam path. In this way, the two quadrupoles act together to form a magnetic lens (sometimes referred to as a "doublet"), and the focusing and steering is accomplished as the electron beam passes through the quadrupole "lens." The "focusing" provides a desired focal spot shape and size, and the "steering" effects the positioning of the focal spot on the anode target surface 28. Each quadrupole is implemented with a core section, or a yoke, denoted as a cathode core at 104, and an anode core at 102. The anode core 102 also has the two dipoles.

FIG. 1C shows a cross-sectional view of an embodiment of a cathode assembly 10 that can be used in the X-ray tube 1 with the planar electron emitter 22 and magnetic system 100 described herein. As illustrated, a throw path between the electron emitter 22 and target surface 28 of the anode 14 can include the acceleration region 26, drift region 24, and aperture 50 formed in shield 7. In the illustrated embodiment, the aperture 50 is formed via aperture neck 54 and an expanded electron collection surface 56 that is oriented towards the anode 14.

Figure 2A:
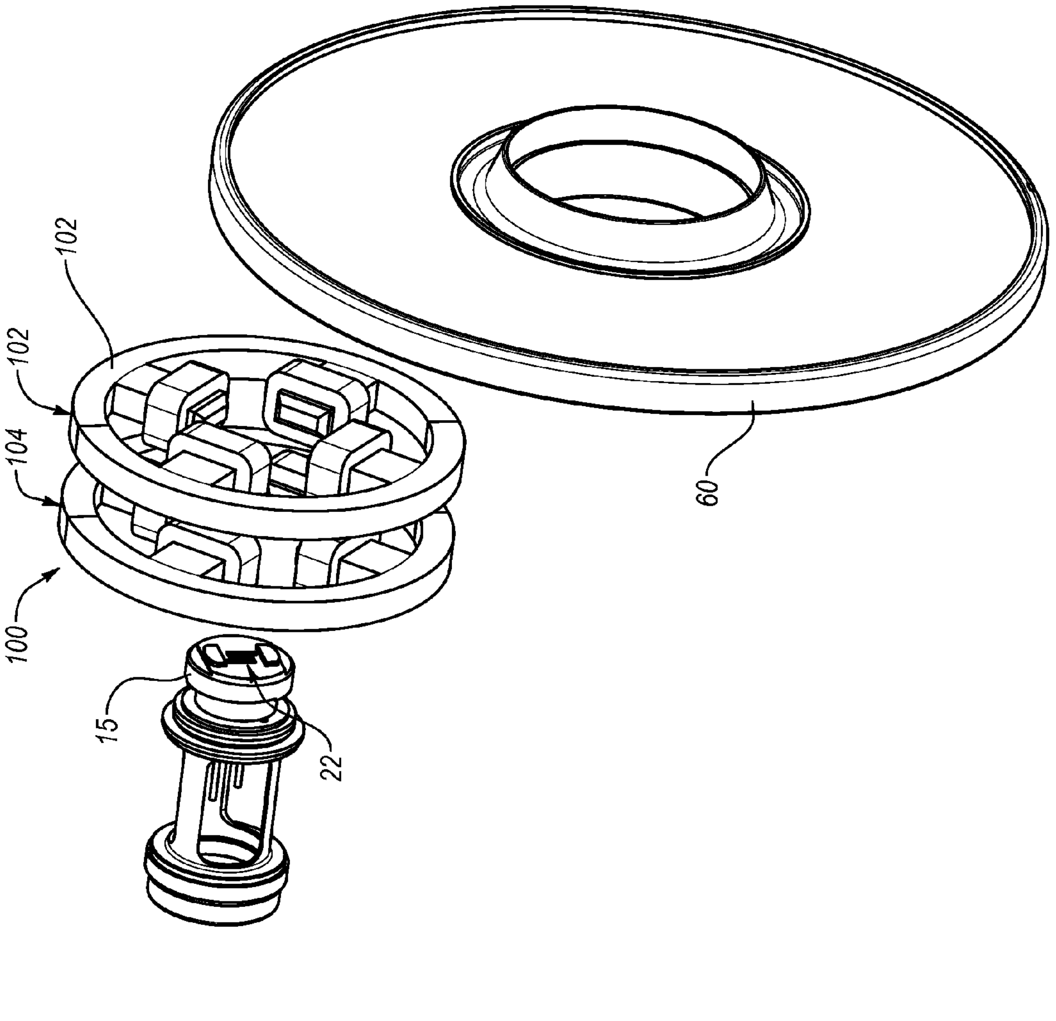
FIG. 2A is a perspective view of internal components of an embodiment of an example X-ray tube.

FIG. 2A shows the components of the X-ray device that are arranged for electron emission, electron beam steering or focusing, and X-ray emission. The cathode head 15 is shown with the planar electron emitter 22 oriented so as to emit electrons in a beam 12 towards the anode 14 so as to pass through the cathode core 104 and then anode core 104. In FIG. 2A, disposed within the beam path is the magnetic system 100 configured to focus or steer the electron beam before reaching the anode 14, as noted above.

Figure 2B:
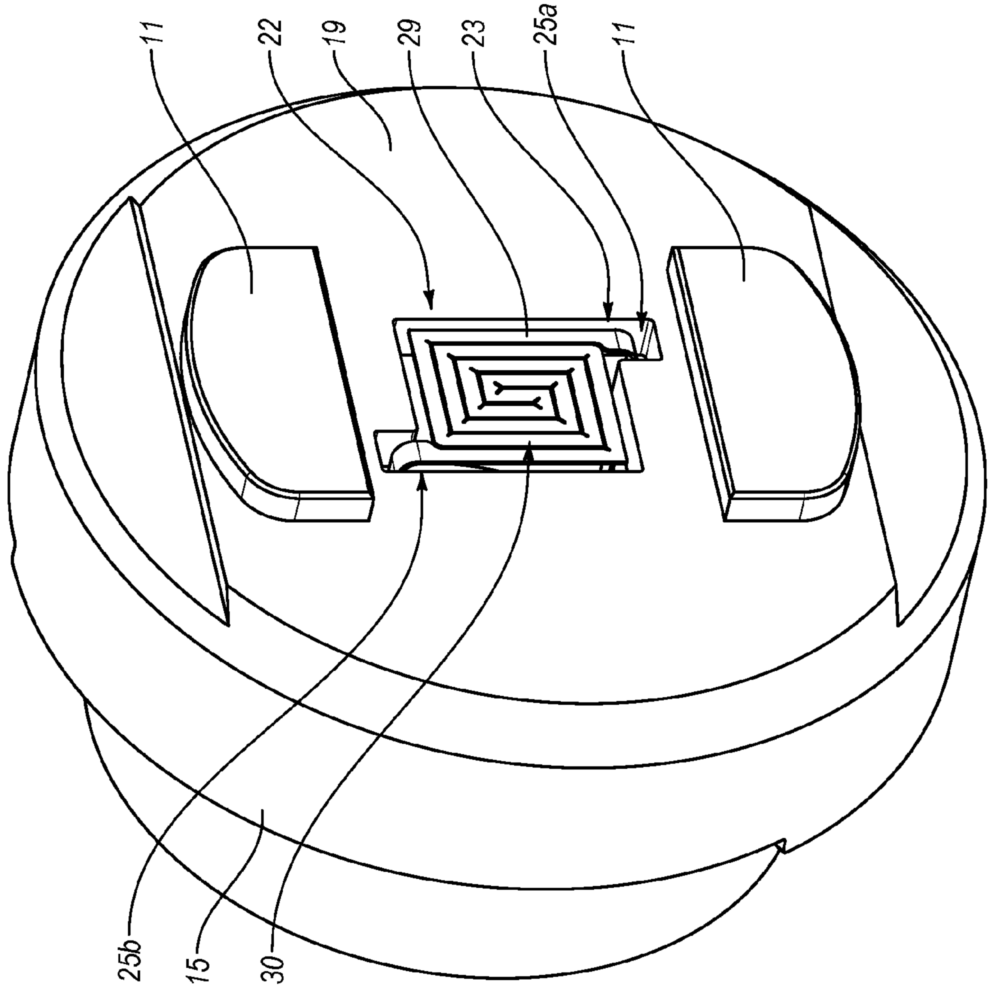
FIG. 2B is a perspective view of an embodiment of a cathode head and planar electron emitter.

II. Example Embodiments of a Planar Emitter with Tunable Emission Characteristics FIG. 2B illustrates a portion of the cathode assembly 10 that has the cathode head 15 with the electron emitter 22 on an end of the cathode head 15 so as to be oriented or pointed toward the anode 14 (see FIGS. 1C and 2A for orientation). The cathode head 15 can include a head surface 19 that has an emitter region 23 that is formed as a recess in surface 19 that is configured to receive the electron emitter 22, which further includes a first lead receptacle 25*a* configured to house a first lead 27*a* of the electron emitter 22 and second lead receptacle 25*b* configured to house a second lead 27*b* of the electron emitter 22 (see FIG. 2C for first lead 27*a* and second lead 27*b*). The emitter region 23 can have various configurations, such as a flat surface or the illustrated recess shaped to receive the electron emitter 22, and the first and second lead receptacles 25*a*-*b* can be conduits extending into the body of the cathode head 15. The head surface 19 also includes electron beam focusing elements 11 located on opposite sides of the electron emitter 22.

Figure 2C:
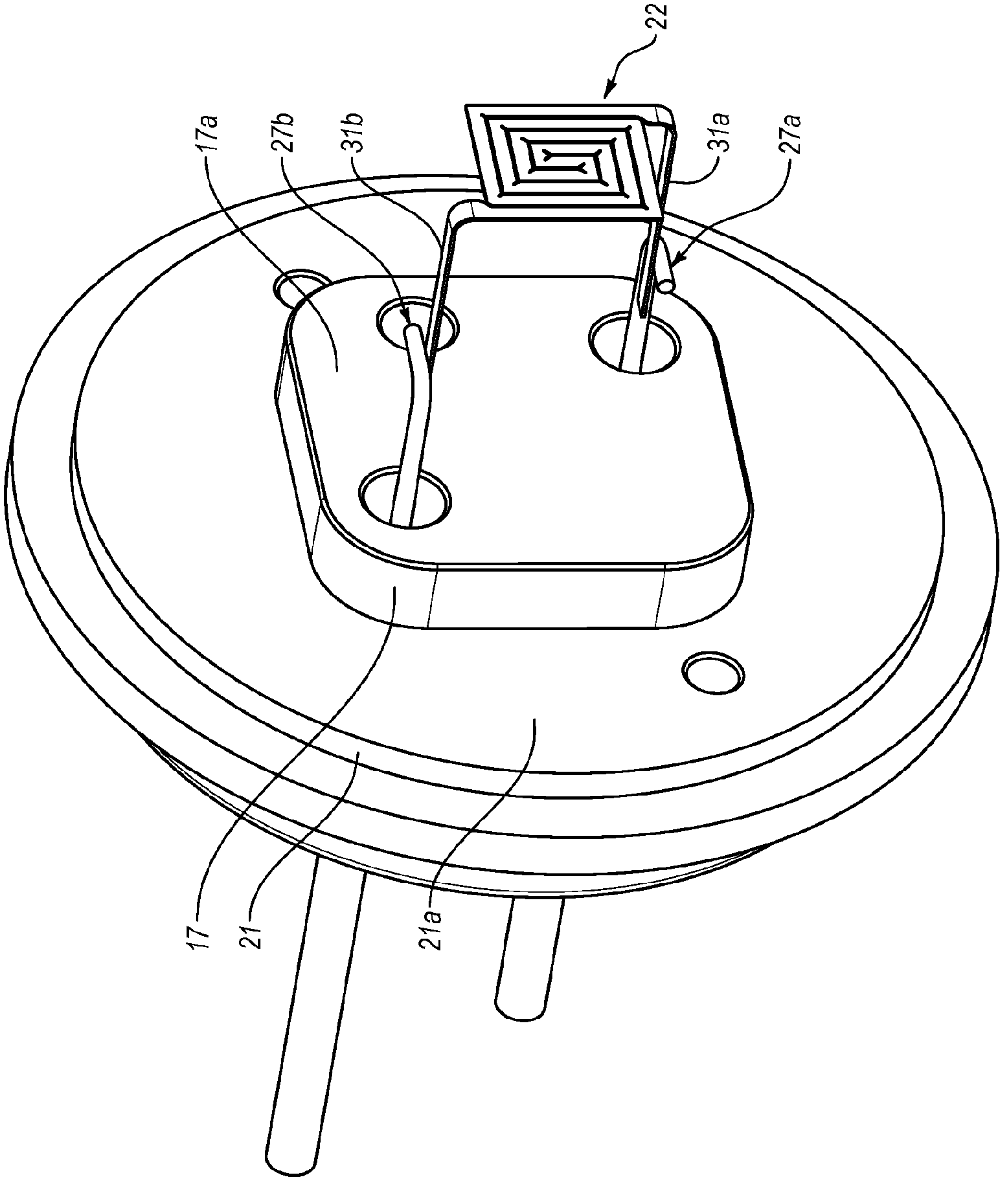
FIG. 2C is a perspective view of an embodiment of an internal region of the cathode head that shows electrical leads for the planar electron emitter of FIG. 2B.

FIG. 2C illustrates an embodiment of an internal region of the cathode head 15 that shows electrical leads 27*a*, 27*b* for the planar electron emitter 22. As shown, a base 21 can be dimensioned to receive the cathode head 15 thereover. The base 21 can include a lead housing 17 protruding from a base surface 21*a*. The lead housing 17 can include a lead housing surface 17*b* that has the first lead receptacle and second lead receptacle formed therein. The first lead receptacle houses the first lead 27*a*, and the second lead receptacle houses the second lead 27*b*. The first lead 27*a* is electrically coupled to a first leg 31*a*, and the second lead 27*b* is electrically coupled to a second leg 31*b*. The electrical coupling may be structurally reinforced with a mechanical coupling between the leads 27*a*, 27*b* with the legs 31*a*, 31*b*. The mechanical coupling can be by welding, brazing, adhesive, mechanical coupling or other coupling that keeps the first and second leads 27*a*, 27*b* physically and mechanically coupled with the corresponding first and second legs 31*a*, 31*b*. The first and second leads 27*a*, 27*b* can be electrically connected to the cathode assembly 10 as known in the art.

Figure 2D:
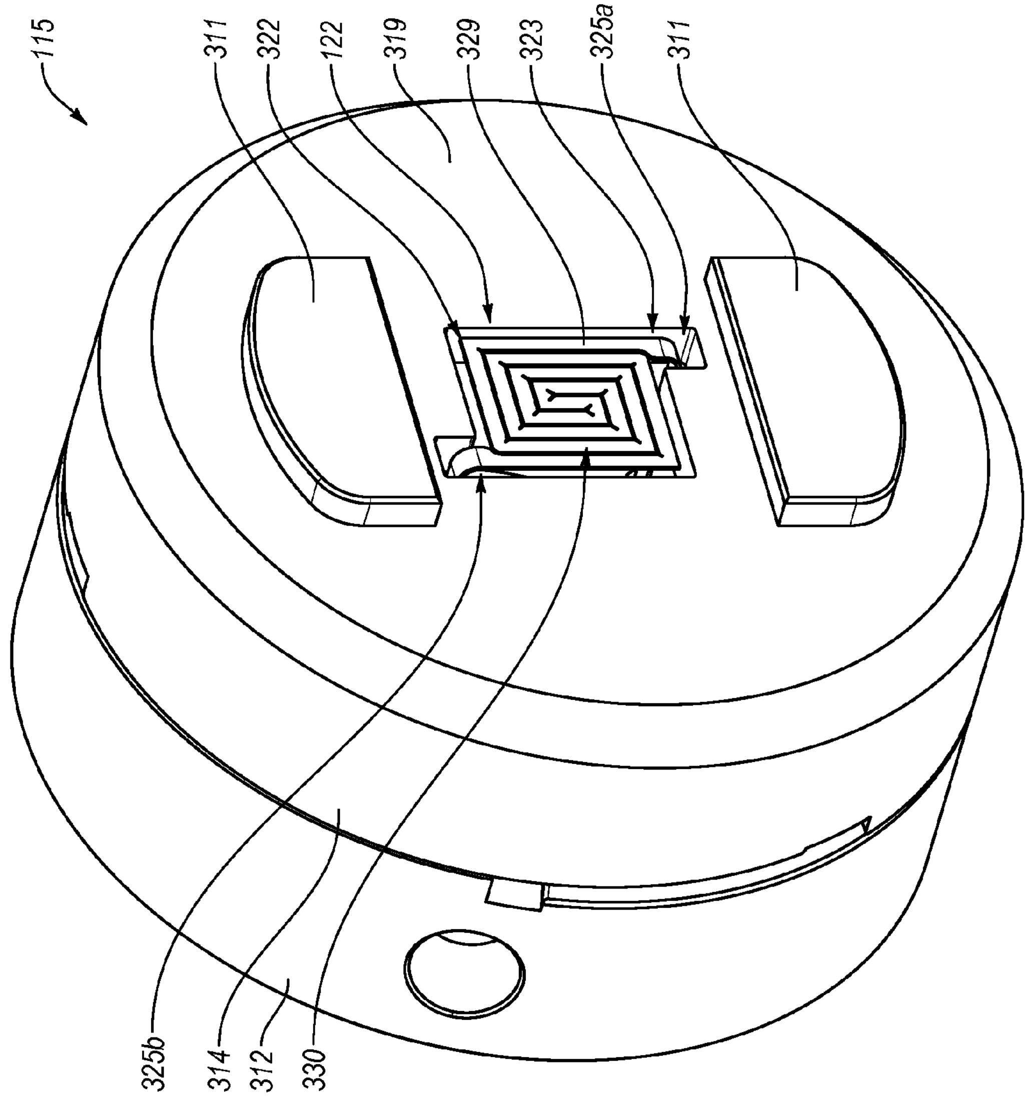
FIG. 2D is a perspective view of an embodiment of a cathode head and planar electron emitter with an adjustable height.

FIG. 2D shows the cathode head 115 to have an emitter height adjustment mechanism 310, which includes a rotating member 312 and an elevating member 314. Rotation of the rotating member 312 in one direction elevates the emitter 122, and rotation of the rotating member 312 in the other direction sinks the emitter 122. The raising of the emitter 122 can be by the cathode head surface 319 raising relative to the emitter 122. That is, the emitter can be attached to the base, and the elevating member raises relative to the emitter 122. The rising and sinking of the emitter 122 by the adjustment mechanism 310 can be relative to the head surface 319. As such, the emitter 122 can be elevated or sunk relative to a recess 322 in the head surface 319, where the recess 322 can be shaped and dimensioned to accommodate the emitter 122 therein. The elevating member 314 may rise or lower while the emitter 122 stays at a fixed height. However, a modification can be the rotation of an elevating member elevating the emitter up or down and the surface 319 staying at a fixed height.

Figure 3A:
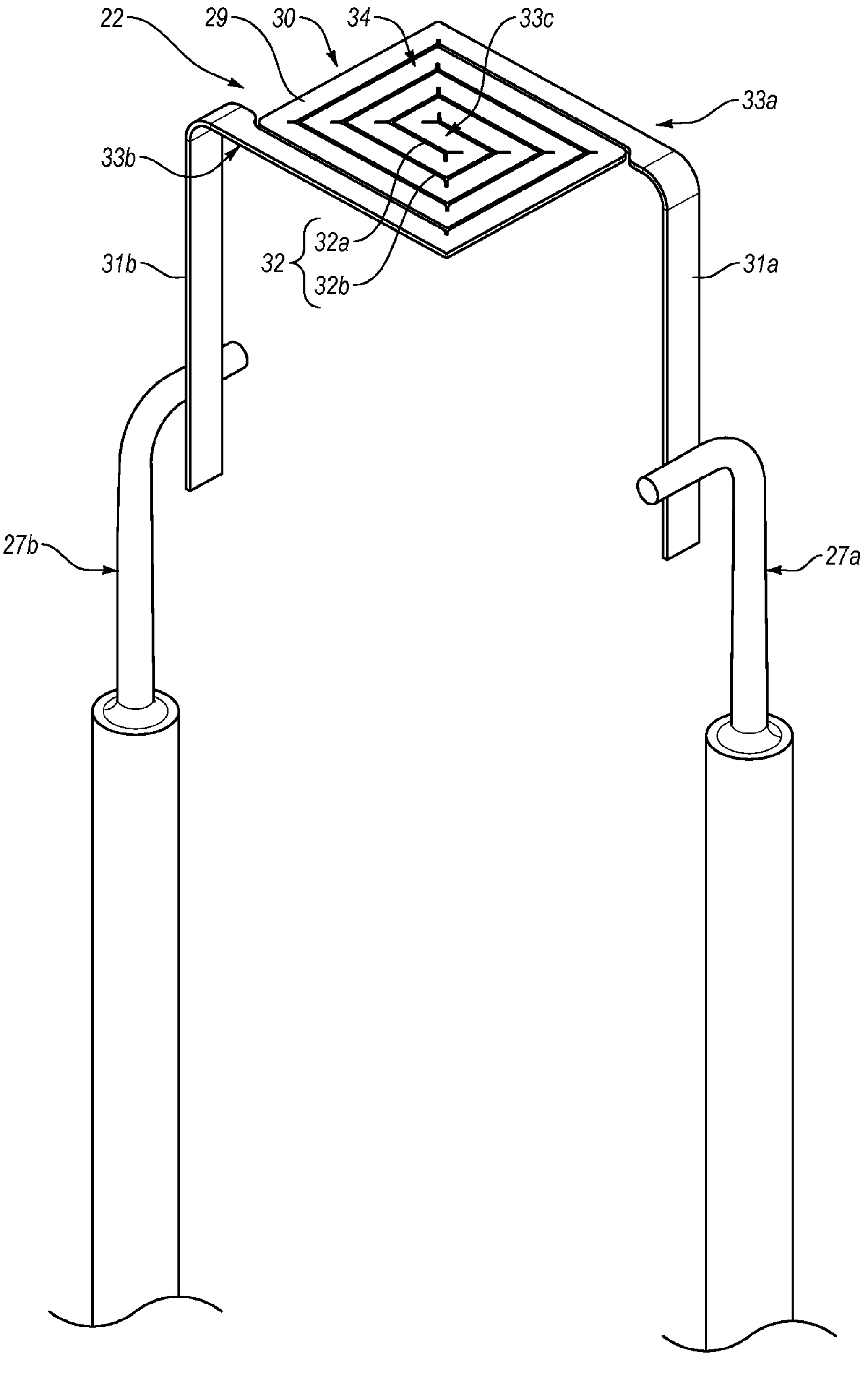
FIG. 3A is a perspective view of an embodiment of a planar electron emitter coupled to electrical leads.

FIG. 2D illustrates a portion of the cathode assembly 110 that has the cathode head 115 with the electron emitter 122 on an end of the cathode head 115 so as to be oriented or pointed toward the anode 114 (see FIGS. 1C and 3A for orientation). The cathode head 115 can include a head surface 319 that has an emitter region 323 that is formed as a recess 322 in head surface 319 that is configured to receive the electron emitter 122, which further includes a first lead receptacle 325*a* configured to house a first lead of the electron emitter 122 and second lead receptacle 325*b* configured to house a second lead of the electron emitter 122. The emitter region 323 can have various configurations, such as a flat surface or the illustrated recess 322 shaped to receive the electron emitter 122, and the first and second lead receptacles 325*a*-*b* can be conduits extending into the body of the cathode head 115. The head surface 319 also includes electron beam focusing elements 311 located on opposite sides of the electron emitter 122.

FIG. 3A illustrates an embodiment of the electron emitter 22 coupled with the first and second leads 27*a*, 27*b*. The electron emitter 22 includes an emitter body 29 that is continuous from the first lead 27*a* to the second lead 27*b* and forms an emitter pattern 30. The emitter pattern 30 can be two-dimensional so as to form a planar emitter surface 34, where different regions of the emitter body 29 cooperate to form the planar emitter surface 34. There are gaps 32 (e.g., illustrated by lines between members) between different regions of the emitter body 29, where the gaps 32 may form a first continuous gap 32*a* from a first end 33*a* to a middle region 33*c* and the gaps 32 may form a second continuous gap 32*b* from the middle region 33*c* to a second end 33*b* of the planar emitter surface 34. As illustrated, the middle region 33*c* of the planar emitter surface 34 is also the middle region of the electron emitter 22 and middle region of the emitter body 29 and the emitter pattern 30. However, other arrangements, configurations, or patterns may be implemented to an electron emitter 22 so as to have a planar emitter surface 34.

The emitter body 29 can have various configurations; however, one configuration includes at least one flat surface 41 (e.g., flat side, see FIG. 3C) that when patterned in a planer emitter pattern 30 forms the planar electron emitter 22. That is, the emitter body 29 is continuous and patterned so that electrical current flows from the first lead 27*a* through the emitter body 29 in the emitter pattern 30 to the second lead 27*b*, or vice versa.

In one aspect, no portions or regions of the emitter body 29 touch each other from the first end 33*a* to the second end 33*b*. The emitter pattern 30 may be tortuous with one or more bends, straight sections, curved sections, elbows or other features; however, the emitter body 29 does not include any region that touches another region of itself. In one aspect, all of the sections between corners or elbows are straight, which can avoid open windows or open apertures of substantial dimension within the emitter pattern 30, where openings of substantial dimensions can cause unwanted side electron emission lateral of the throw path 50. Thus, the electrical current only has one path from the first lead 27*a* to the second lead 27*b*, which is through the emitter body 29 in the emitter pattern 30 from the first end 33*a* to the second end 33*b*. However, additional leads can be coupled to the emitter body 29 at various locations of the emitter pattern 30 so as to tune the temperature and electron emission profiles. Examples of locations and configurations of additional leads is described in more detail below.

Figure 3B:
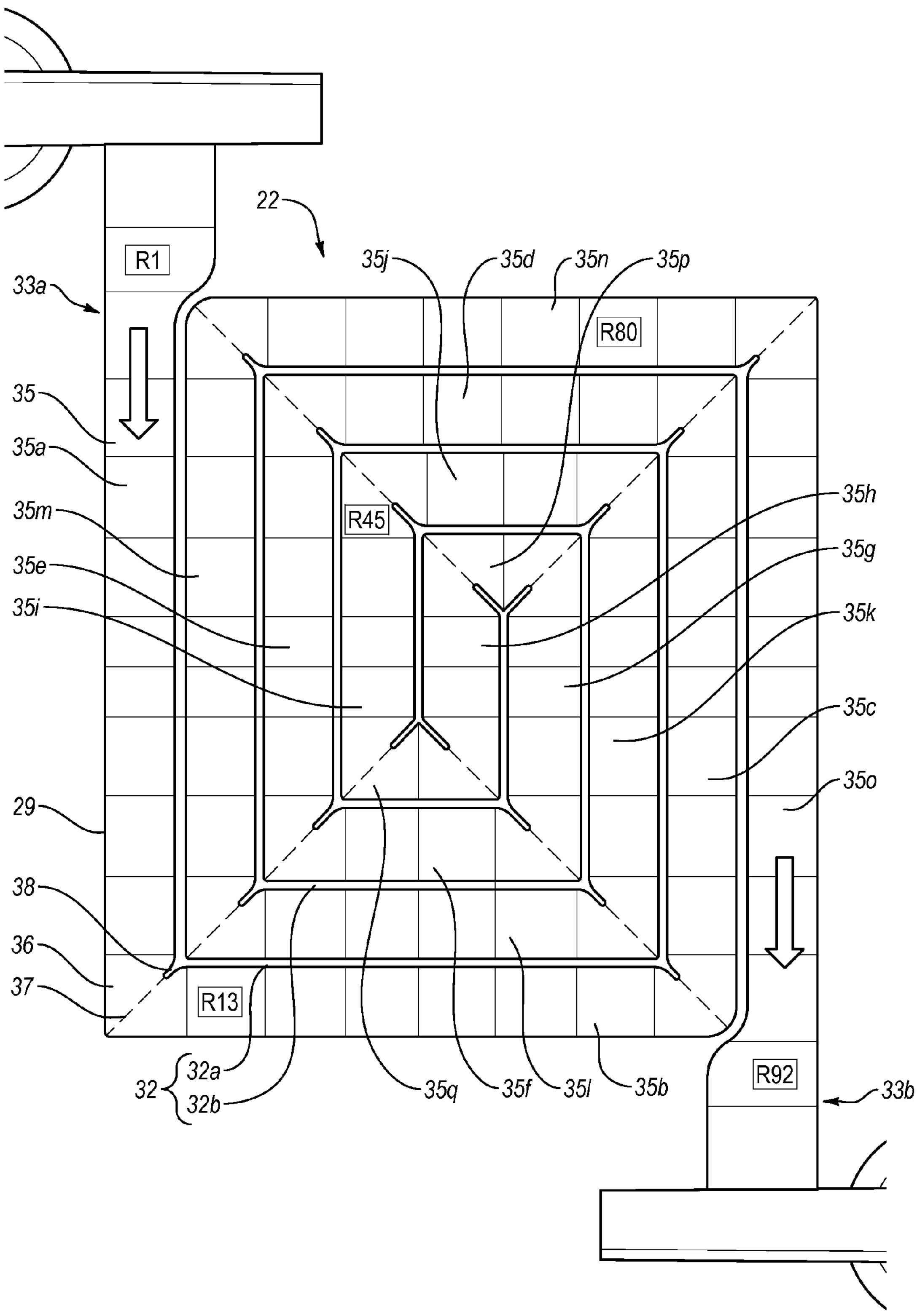
FIG. 3B is a top view of an embodiment of a pattern for a planar electron emitter.

The planar layout (e.g., planar emitter pattern 30) of the current path of the electron emitter 22 is created to produce a tailored heating profile. The tailoring can be performed during the design phase in view of various parameters of one or more end point applications. Here, since the emission of electrons is thermionic, emission can be controlled and matched to the desired emitting region (e.g., one or more rungs 35, see FIG. 3B) of the electron emitter planar surface 34 by designing the heating profile of the emitting region. Further, tailoring the temperature and emission profiles during design protocols allows the profile of the emitted electron beam to be controlled and can be used to create the desired one or more focal spots. This configuration of a planar electron emitter 22 is in direct contrast to traditional helically wound wire emitters, which do not create electron paths that are perpendicular to the emitter surface, and therefore are not useful in, for example, so-called “long throw” applications. Additionally, the shape and size of a circular flat emitter limits total emission and the shape does not easily facilitate tailoring the spot size and shape to a particular application. On the other hand, embodiments of the proposed planar emitter such as shown in FIGS. 3A-3B can be scalable and the emitter form and pattern can be designed to be tailored to various shapes and can be used in any type of X-ray tube, including but not limited to long throw tubes, short throw tubes, and medium throw tubes, as well as others. The magnetic systems can also be used in any type of X-ray tube, including but not limited to long throw tubes short throw tubes and medium throw tubes, as well as others FIG. 3A also shows that the first lead 27*a* can be coupled to a first leg 31*a* at the first end 33*a* of the emitter body 29 and the second lead 27*b* can be coupled a second leg 31*b* at the second end 33*b* of the emitter body 29. As shown, the first leg 31*a* is opposite of the second leg 31*b*; however, in some configurations the first leg 31*a* may be adjacent or proximal of the second leg 31*b* or at any point on the emitter pattern 30.

In one embodiment, the electron emitter 22 can be comprised of a tungsten foil, although other materials can be used. Alloys of tungsten and other tungsten variants can be used. Also, the emitting surface can be coated with a composition that reduces the emission temperature. For example, the coating can be tungsten, tungsten alloys, thoriated tungsten, doped tungsten (e.g., potassium doped), zirconium carbide mixtures, barium mixtures or other coatings can be used to decrease the emission temperature. Any known emitter material or emitter coating, such as those that reduce emission temperature, can be used for the emitter material or coating. Examples of suitable materials are described in U.S. Pat. No. 7,795,792 entitled "Cathode Structures for X-ray Tubes," which is incorporated herein in its entirety by specific reference.

FIG. 3B shows a top view of the electron emitter 22 described in connection to FIG. 3A. The top view allows for a clear view of various features of the electron emitter 22 that are now described in detail. The emitter body 29 includes rungs 35 connected together at corners 36 so as to form the emitter pattern 30, where the rungs 35 are the elongate members between the corners 36 and connected end to end (e.g., 35*a*-35*o*) at the corners 36 from the first end 33*a* to the second end 33*b*. As shown in FIG. 3B, there are four left side rungs 35*a*, 35*e*, 35*i*, 35*m*, four right side rungs 35*c*, 35*g*, 35*k*, 35*o*, three top rungs 35*d*, 35*j*, 35*n*, three bottom rungs 35*b*, 35*f*, 35*l*, and a central rung 35*h*, which is based on portrait page orientation. However, any number of rungs 35 from a central rung 35*h* or central point to the outer rungs, to the right, left, top or bottom, can be used as is reasonable. Also, the emitter regions 35*p*, 35*q* between the central rung 35*h* and connected rungs 35*g*, 35*i* may be considered rungs 35 or mini rungs, where these emitter regions 35*p*, 35*q* are between the webs 37, which results in four left, right, top , and bottom rungs. However, the electron emitter 22 can include any number of rungs and in any orientation or shape. Each corner 36 is shown to have a slot 38 protruding from the gap 32 into the corner 36. The body of the corner 36 between the slot 38 and the apex of the corner is referred to as a web 37, which is shown be a dashed line in the corners 36. The web 37 can extend from the nadir (e.g., inside or concave part) to the apex (e.g., outside or convex part). The slots 38 are all shown to extend from the gap 32 through the nadir toward the apex; however, the slots 38 may extend from the apex toward the nadir. When there is a slot 38 at the nadir, the nadir is considered to be the intersection that would have occurred from the connected rungs 35 had the slot 38 been absent, which results in the nadir being in the slot. As such, the nadir is not at the termination of a slot 38 within a corner 36. The apex and nadir are the true apex and nadir without any slots or cutouts at the corner. As shown, the gaps 32 separate all of the rungs 35 from each other and all of the corners 36 from each other. This provides for a single electrical path shown by the arrows from the first end 33*a* to the second end 33*b*.

The rungs 35 can all be the same dimension (e.g., height and/or width), all be different dimensions, or any combination of same and different dimensions from the first end 33*a* to the second end 33*b*. The gaps 32 can all be the same dimension (e.g., gap width dimension between adjacent rungs 35), all be different dimensions, or any combination of same and different dimensions from the first end 33*a* to the middle region 33*c* and from the middle region 33*c* to the second end 33*b*. The corners 36 can all be the same configuration, all be different configurations, or any combination of same and different configurations from the first end 33*a* to the second end 33*b*. The webs 37 can all be the same dimension, all be different dimensions, or any combination of same and different dimensions from the first end 33*a* to the second end 33*b*. Changing the dimension of any of these features, alone or in combination, can change the electron emission profile, which allows for selective combinations to tune the electron emission profile. Additionally, the longitudinal length of each rung may be changed or optimized in order to obtain a desired temperature profile.

In one example, the width all of the outer rungs 35*a*, 35*b*, 35*n*, 35*o* can be the same dimension, while the rest of the rungs can all be another different dimension. In one example, the gaps 32 adjacent to all of the outer rungs 35*a*, 35*b*, 35*n*, 35*o* can be the same dimension, while the rest of the gaps 32 can all be another different dimension. In one example, the corners 36 can have an apex that is smooth and rounded or sharp and pointed. In one example, the webs 37 at outer corners 36 can be a different dimension from the webs 37 at inner corner 36.

For example, the outer rungs 35 can be fabricated so as to be wider than middle rungs and/or inner rungs 35, thereby assuring less electrical resistance so as to remain cooler resulting in lower (or no) emission of electrons. Moreover, the widths of the gap 32 between adjacent rungs 35 can be adjusted to compensate for rung width thermal expansion and rung length thermal expansion, as well as for width and length contraction.

In one embodiment, the web 37 widths can be used to tune the resistance in the rungs 35, and thereby the heating and temperature of each rung 35 due to current passing therethrough can be tuned. For example, in certain applications the midpoints of the rungs 35 can be heated readily, with the ends at the corners 36 or at the webs 37 tending to be cooler. Adjusting the dimension of the webs 37 provides a level of control to "tune" the thermionic emission characteristics of the electron emitter 22. The webs 37 can be dimensioned such that the temperature of the rung 35 matches a desired value and is more uniform between corners 36 along the lengths of each rung 35. This affects the rungs 35 on either side of the corner 36, so a web 37 can be matched to the two rung lengths of the rungs 35 that the particular web 37 is between. This also provides some control over individual rung 35 temperatures so it is possible to create a temperature profile across the width and length of the entire electron emitter 22 which can be tailored or tuned to meet various needs or specific applications. Tuning the web 37 dimensions can be accomplished by varying the dimension of the slots 38 that extend from the gaps 32 and terminate in the corners 36. Tuning web dimensions can be considered a primary design tool for tuning temperature and electron emission profiles of the electron emitter 22. Often, the web 37 can be about the same dimension as the width of the rugs 35, or within 1%, 2%, 4%, 5%, or 10% thereof.

In one embodiment, the width of one or more of the rungs 35 can be adjusted to tune the temperature profile, which in turn tunes the electron emission profile; however, this approach can be considered to be a secondary design tool in terms of achieving specific temperature and electron emission profiles. In certain applications, modification of the width of the rungs 35 may not have as strong of an effect on the temperature profile, and might tend to heat or cool the entire length of the rung 35. However, this approach can be used to suppress the emission on the outer rungs 35*a*, 35*b*, 35*n*, 35*o* of the electron emitter 22. Dimensioning the outer rungs 35*a*, 35*b*, 35*n*, 35*o* to be larger or have a larger dimension can avoid emission from the outer rungs 35*a*, 35*b*, 35*n*, 35*o*, where emission from these outer rungs 35*a*, 35*b*, 35*n*, 35*o* can create undesirable X-rays that manifest as wings and/or double peaking in the focal spot. On the other hand, dimensioning the middle rungs or inner rungs as well as the central rung to be relatively smaller in dimension can enhance emission from these rungs 35. As such, dimensioning one or more rungs 35 to be smaller than one or more other rungs 35 can result in the smaller rungs having enhanced electron emission compared to the larger rungs. Thus, any one or more rungs 35, connected or separated, can be dimensioned to be smaller to increase electron emission or dimensioned to be larger to inhibit electron emission.

In certain embodiments, the electron emitter 22 can be configured with different dimensions of rungs 35, gaps 32, and/or webs 27 to limit or suppress electron emission from certain rungs 35 of the emitter such that electrons are emitted from different areas of the emitter at different rates. For example, due to proximity to other structures at the perimeter of the electron emitter 22, which may cause the emitted electrons to have an unwanted trajectory, the outer rungs 35 can have a larger dimension (e.g., wider) compared to the inner rungs 35 or central rung 35*h*, which causes lower temperatures in the outer rungs 35 and thereby comparatively less electron emission from the outer rungs 35. Different dimension parameters of the rungs 35, gaps 32, and/or webs 27 can be used to obtain a smaller electron emission area from a physically larger electron emitter 22. For example, only the central rung 35*h* and adjacent inner rungs 35 may significantly emit electrons from the electron emitter 35 by tuning the different dimension parameters. Alternatively, the central rung 35*h* and/or inner-most rungs 35 can be dimensioned to be thicker than rungs 35 between these rungs 35 and the outer rungs 35 to create a hollow beam of electrons. Any one of a different number of emission profiles can be provided, including non-uniform or non-homogenous profiles by tuning the dimensional parameters of the rungs, webs, and gaps of the planar electron emitter 22.

While the dimensions of the rungs 35, gaps 32, and/or webs 27 is usually considered in the planar dimension that is shown in FIG. 3B, the orthogonal dimension (e.g., height that is into or out from the page of FIG. 3B) may also be tuned. Also, the dimension of the rungs 35, gaps 32, and/or webs 27 being tuned can be width or height so that the cross-sectional area is tuned. On the other hand, the height can be set where the width is tuned so that the planar emitter surface 34 is tuned for electron emission.

In one embodiment, relative cooling of rungs 35 in other positions can be done by making these rungs 35 relatively larger as needed to modify the emission profile and/or to create other focal spots or multiple focal spots. For example, as noted, relative cooling (e.g., comparatively reduced temperature) of the central rung 35*h* or inner-most rungs (e.g., 35*f*, 35*g*, 35*i*, 35*j*, optionally 35*p*, 35*q*) of the electron emitter 22 can be done by making these rungs have a larger dimension (e.g., wider) compared to the middle rungs (e.g., 35*c*, 35*d*, 35*e*, 35*k*, 35*l*, 35*m*) to create a hollow beam for certain applications. The outer rungs (e.g., 35*a*, 35*b*, 35*n*, 35*o*) can be larger than the middle rungs 35 so that the outer rungs 35 do not substantially emit electrons. Also, if central rung 35*h* and the middle rungs 35 are smaller than the inner-most rungs 35, then a spot in halo electron emission profile can be generated. If the central rung 35 and optionally inner-most rungs are smaller than the middle and outer rungs, then the electron emission can be condensed into the center of the electron emitter 22. Thus, the dimensions of different rugs 35 can be tailed alone, or with the dimension of the webs 37, for tuning temperature and electro emission profiles.

In another embodiment, a variable width down the length of one or more rungs 35 can provide a tuned temperature and emission profile. However, such rung 35 dimensioning should be tailored in view of adjacent rungs 35 across the gaps 32 to avoid larger gaps 32 between rungs 35, which larger gaps 32 can in turn create more edge emission electrons with non-parallel paths, which is unfavorable.

In one embodiment, it can be desirable to dimension the gaps 32 in accordance with the thermal expansion coefficient of the emitter body material so that a gap 32 always exists between adjacent rungs 35 while cool and while fully heated. This maintains the single electrical current path from the first end 33*a* to the second end 33*b*.

In view of design optimization of the emitter pattern 30 and dimensions thereof, the following dimensions can be considered to be example dimensions that can be designed by the design protocols described herein. The height (e.g., material thickness) of each rung 35 can be about 0.004", or about 0.004" to 0.006", or about 0.002" to 0.010". The rung 35 width can be about 0.0200", or about 0.0200" to 0.0250", or about 0.0100" to 0.0350". The rung 35 width can be determined along with the rung length and rung thickness so that each rung is designed to match the emitter supply's available current. The rung 35 length can be about 0.045" to 0.260", or about 0.030" to 0.350", or about 0.030" to 0.500", where the rung 35 length can be dimensioned depending on the emission area and the resulting emission footprint. The gap 32 width can be about 0.0024" to 0.0031", or about 0.002" to 0.004", or about 0.001" to 0.006", where the gap 32 width can depend on thermal expansion compensation needed to maintain the gaps so that the adjacent rungs 35 do not touch. The web 37 dimension can be about 0.0200" to 0.0215", or about 0.0200" to 0.0250", or about 0.0100" to 0.0350", which dimension can be tied to rung 35 width and the desired heating profile. The result of the dimensioned emitter 22 is that for a given heating current, desired emission current (mA), focal spot size, and allowed foot print, the dimensions of the rung 35, web 37, and gap 32 can be modified to design an emitter 22 that creates a laminar electron beam needed for a particular application.

Additionally, FIG. 3B shows five different number blocks: R1, R13, R45, R80, and R92, which correspond with the ninety-two discrete regions of the emitter body 29 from the first end 33*a* (e.g., region R1) to the second end 33*b* (e.g., region R92) shown by the squares on the rungs 35. Each of these regions were analyzed for temperature upon being energized by electrical current, which data is shown and described in FIGS. 5A and 5B and Tables 1 and 2 below.

Figure 3C:
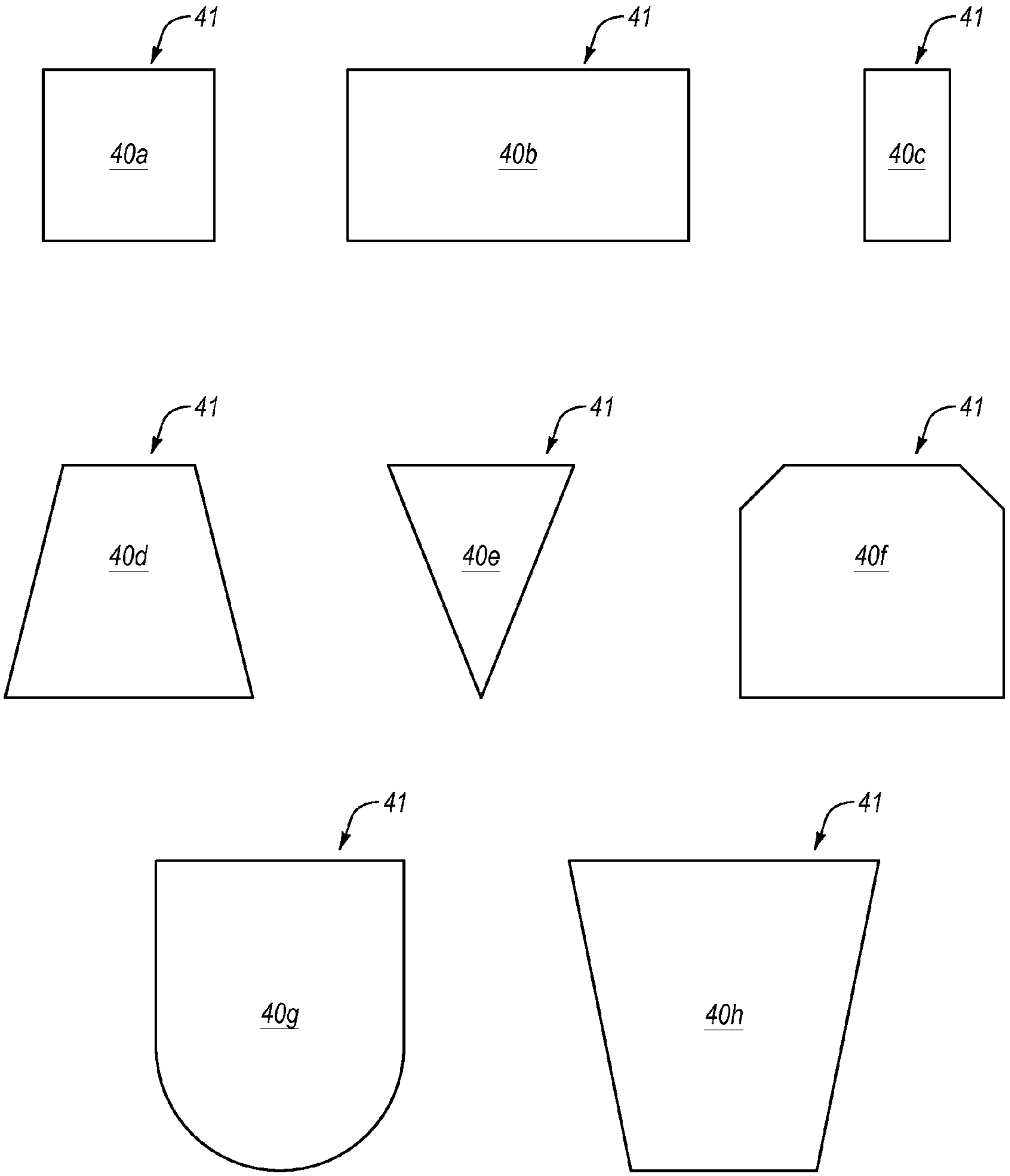
FIG. 3C is a cross-sectional view of embodiments of cross-sectional profiles of rungs of a planar electron emitter.

FIG. 3C illustrates various cross-sectional profiles 40*a*-40*h* of the rungs 35, where each has a flat emitting surface 41. As such, the electrons are preferentially emitted from the flat emitting surface 41, such that all of the flat emitting surfaces 41 of the rungs 35 cooperate to form the planar emitting surface 34. However, round emitting surfaces (not shown) may be used in some instances for forming the planar emitting surface 34.

In yet other embodiments, other general shapes and/or other cut patterns can be designed to achieve a desired emission profile for an electron emitter. Various other configurations, shapes, and patterns can be determined in accordance with the electron emitter embodiments described herein.

Also, additional attachments can be made for shortening the current path or creating adjacent emitters from the same field, for example. In one example, the attachments can be additional legs that may or may not be coupled to additional electrical leads. The attachments can be at any region from region R1 to region R92 (see FIG. 3B). When coupled to electrical leads, the attachments can define new electron paths to cause some regions to have current and others to have no current, which can result in inhomogeneous temperature and emission profiles. The locations of the attachments can then provide for custom electron paths and thereby custom emission patterns. While not shown, additional legs, e.g., conductive or non-conductive, could be provided for support the electron emitter if needed for a given application. The legs can be attached at the ends, edges, center, or other locations of the rungs along the emitter or at any other locations. When non-conductive, the legs can be attached to any region and provide support to keep the emitter 22 to have the planar emitter surface 34. When conductive, the legs can be attached to any region to provide support to keep the emitter 22 to have the planar surface 34 and to define electron flow paths to customize the temperature and emission profiles.

In one embodiment, the gaps 32 between some of the rungs 35 can be dimensioned to be true gaps 32 while cool, but then once thermal expansion occurs, the gaps 32 shrink so that the adjacent rungs 35 contact each other to create a new electrical current path. This can be done to cause the effective dimension to be small at low temperatures, but then increase at higher temperatures so that the rungs 35 that touch upon thermal expansion can provide an effectively larger rung 35 that reduces the local temperature. Such variable gap 32 dimensions that close upon heating can be designed so that the electron emitter has a certain temperature and electron emission profile upon full operation. For example, the gap 32 between outer rungs 35 can close upon heating so that the outer rungs 35 emit significantly less electrons than the central rungs 35.

In one embodiment, the design of the electron emitter 22 can be conducted so that the heating profile of the emitter 22 can be tailored to meet any desired temperature and emission profile. Also, each direction across any rung 35, web 37, or gap 32 can be designed so that the temperature profile of the entire planar emitting surface can be tailored to produce the overall desired electron emission profile. Electron emission can be suppressed in desired regions on the emitter to meet the needs of a given application. Hollow beams, square, or rectangular beams as well as specific electron intensity emission distributions can be created to meet a given imaging need. Modulation Transfer Function (MTF) responses can also be matched for a desired application, which may be determined with the beam focusing devices.

In one embodiment, designs for the layout of the electron emitter 22 can be scaled to increase emission area to facilitate higher power imaging applications or to match power levels for specific applications. That is select rungs 35 can be relatively smaller compared to other rungs 35 to determine which rungs 35 will preferentially emit electrons. In some instances, a large number of rungs 35 can be dimensionally smaller to increase the emission from these rungs 35 and thereby increase the size of the emission stream.

In one embodiment, the design of the electron emitter 22 to maintain the planar emitter surface 34 throughout heating and electron emission can be obtained with the illustrated emitter pattern 30. The planar nature of the emitter produces electron paths substantially perpendicular to the emitting surface. Maintaining relatively small gaps 32 with no windows or apertures in the emitter pattern 30 can reduce edge or perpendicular electron emission.

In one embodiment, the emitter pattern 30 can be as illustrated in order to have a structural design such that the emitter 22 is self-supporting in the emitting region (e.g., central region) thereby eliminating the need for additional support structures. The emitter pattern of FIG. 3B has been established to be self-supporting without significant curling, bending or warping at high temperatures and electron emission.

In one embodiment, the emitter pattern 30 can be designed such that the outer portions of the emitter 22 do not emit electrons (e.g., or not a significant number), thereby decreasing the effect that any focusing structure has on electrical fields at the edge of the emitter. Often the focusing structure (e.g., beam focusing device 12) includes the field shaping component(s) (e.g., magnetics) around the outer perimeter of the emission pathway or throw path 50. This configuration and reduction of emission from outer rungs 35 improves the behavior of the electron beam, making it more laminar as a whole.

In one aspect, the dimensions of the rungs 25, gaps 32, and webs 37 can be modulated, designed, or optimized so that the electrons are not emitted homogenously (i.e., different areas of the emitter may emit a higher number of electrons than others). The emitter pattern 30 is shaped and dimensioned to have a particular resistivity at one or more select locations, which causes different portions of the emitter 22 to be heated at different temperatures, and thereby have different emission profiles.

In one embodiment, the planar emitter described herein can be utilized in an X-ray tube to emit an electron beam from the cathode to the anode. The configuration of the planar emitter results in an inhomogeneous temperature profile from the first end to the second end and across the entirety of the planar emitter surface when a current is passed through. The inhomogeneous temperature profile is a result of the planar emitter pattern with the rungs, webs, and gap dimensions. Additionally, the description of the planar emitter provided herein describes the ability to tune the emitter to obtain different temperature profiles. The inhomogeneous temperature profile of the planar emitter for a current results in different regions of the emitter having different temperatures, which results in the planar emitter emitting an inhomogeneous electron beam profile. The inhomogeneous electron beam profile is a result of the inhomogeneous temperature profile, where regions of different temperature have different electron emissions. The ability to tailor the temperature profile allows for tailoring the inhomogeneous electron beam profile, such as by selectively dimensioning the different features so that some regions become hotter than others when in operation. Since the emission is thermionic, different regions of different temperatures result different election emissions, and thereby result in the inhomogeneous electron beam. This principle also allows for one, two, or more focal spots by having a number of regions with a high emission temperature and other regions with a low emission temperature or the other regions may not emit electrons by thermionic emission. In certain regions, there can be no electrons emitted or relatively few electrons emitted compared to other regions. Thus, during operation of a single electron emitter, certain regions can have enhanced electron emission and others can have suppressed electron emission to contribute to the inhomogeneous electron beam profile.

The planar emitter can inhomogeneously emit electrons in an electron beam from the substantially planar surface of the emitter with a reduced lateral energy component.

The emitter pattern can be designed in such a way by varying the dimensions of the different rungs, webs, and gaps so that some regions of the emitter (e.g., outside region or outer rungs in one example) do not emit electrons or emit a significantly fewer amount of electrons compared to other regions. This decreases the effect the focusing elements (see FIG. 2B) have on electrical fields at the edge of the emitter. The focusing elements are field shaping components placed about the outer perimeter of the emitter, but which have reduced focusing effect when the outside rungs of the emitter do not emit electrons or emit substantially fewer electrons compared to other regions, such as the middle region. In any event, tailoring the inhomogeneous temperature profile to tune the inhomogeneous electron emission profile can improve the behavior of the inhomogeneous electron beam to become more laminar as a whole.

In one embodiment, a method of inhomogeneously emitting electrons from an electron emitter can include: providing the electron emitter of claim 1 having a planar emitter surface formed by the plurality of elongate rungs; and emitting an inhomogeneous electron beam from the planar emitter surface in a perpendicular direction.

Figure 4:
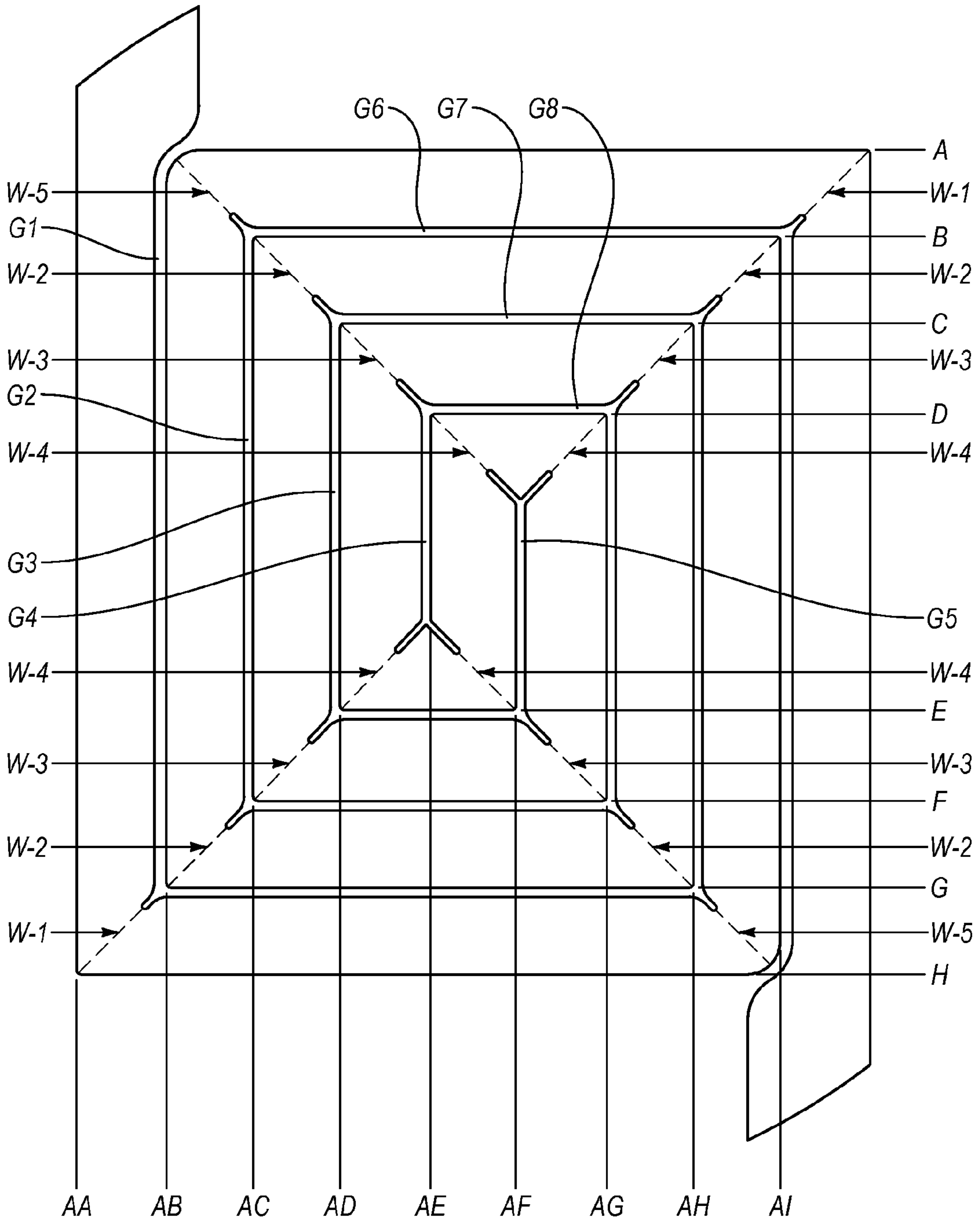
FIG. 4 is a top view of an embodiment of a pattern for a planar electron emitter that identifies certain locations of the pattern for design optimization.

FIG. 4 shows an electron emitter 22 that has the emitter pattern 30 of FIGS. 3A-3B. Select regions of the emitter 22 are selected for dimension optimization. It should be noted that the dimensions of one region relative to one end are duplicated in the corresponding region from the other end, which is shown by the designations W-1, W-2, W-3, W-4, and W-5 being at multiple locations, where the dimensions for different designations is different and the same for same designations.

As shown in the example emitter 22 of FIG. 4, the distances of the features are as follows: from A to B is 0.0224 inches; from A to C is 0.0447 inches; from A to D is 0.0681 inches; from A to E is 0.1445 inches; from A to F is 0.1679 inches; from A to G is 0.1902 inches; and from A to H is 0.2126 inches; from AA to AB is 0.0231 inches; from AA to AC is 0.0455 inches; from AA to AD is 0.0679 inches; from AA to AE is 0.0912 inches; from AA to AF is 0.1132 inches; from AA to AG is 0.1366 inches; from AA to AH is 0.159 inches; and AA to AI is 0.1813 inches. Gap G1 is 0.0031 inches; gap G2 is 0.0024 inches; and Gaps G3, G4, G5, G6, G7, and G8 are all 0.0024 inches. The dimensions of the rungs can be calculated based on the above dimensions. Also, web W-1 is 0.0236 inches and its corresponding slot 38 is 0.0016 inches; web W-2 is 0.0215 inches and its corresponding slot 38 is 0.0016 inches; web W-3 is 0.0205 inches and its corresponding slot 38 is 0.0016 inches; web W-4 is 0.0204 inches and its corresponding slots 38 are each 0.0016 inches; and web W-5 is 0.02 inches with its corresponding slot 38 is 0.0016 inches. Also, the legs 31_a_, 31_b_ can be 0.346 inches. From the forgoing dimensions, the emitter pattern 30 can be determined. Also, any of the dimensions described herein, together or alone, can be modulated by 1%, 2%, 5%, or 10% or more.

Figure 5A:
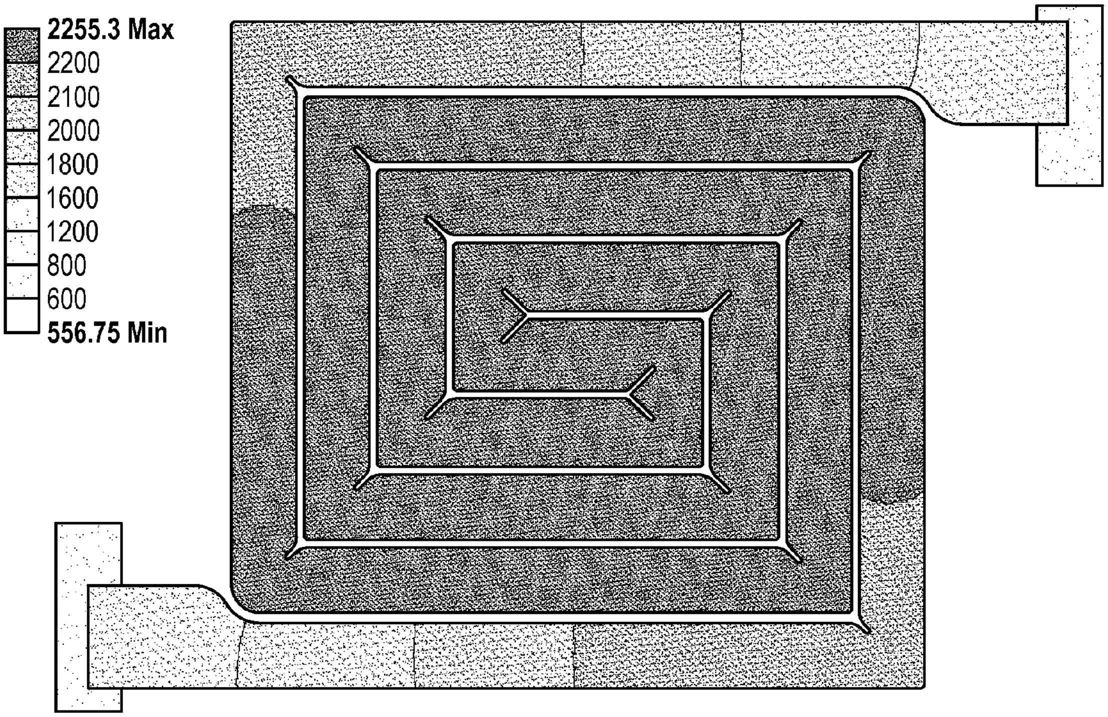
FIGS. 5A-5B are top views of temperature profiles of an embodiment of a planar electron emitter for different maximum temperatures.

FIG. 5A illustrates an emitter temperature profile of the emitter of FIG. 4 for a maximum temperature (Tmax) being 2250 degrees C. with current being 7.75 A, voltage being 8.74 V, and input power being 67.7 W. Specific region temperatures in Celsius from region R1 to region R92 (see FIG. 3B for region designations) are shown in Table 1.

TABLE 1

| Emitter Region # | Max Temp-2250 (with adjusted resistivity) |
|---|---|
| 1 | 1788.6 |
| 2 | 1892.8 |
| 3 | 1970.7 |
| 4 | 2033.8 |
| 5 | 2080.2 |
| 6 | 2103.7 |
| 7 | 2123.2 |
| 8 | 2146.8 |
| 9 | 2164 |
| 10 | 2176.4 |
| 11 | 2187.5 |
| 12 | 2197.1 |
| 13 | 2204.7 |
| 14 | 2210.2 |
| 15 | 2214.1 |
| 16 | 2217.1 |
| 17 | 2220.2 |
| 18 | 2224.5 |
| 19 | 2224.1 |
| 20 | 2226.4 |
| 21 | 2228.5 |
| 22 | 2229.9 |
| 23 | 2231.4 |
| 24 | 2234.1 |
| 25 | 2238.1 |
| 26 | 2243.4 |
| 27 | 2239.6 |
| 28 | 2238.1 |
| 29 | 2239.1 |
| 30 | 2241.9 |
| 31 | 2246.6 |
| 32 | 2242.3 |
| 33 | 2240.2 |
| 34 | 2240.4 |
| 35 | 2241.4 |
| 36 | 2244.4 |
| 37 | 2248 |
| 38 | 2238.9 |
| 39 | 2236.5 |
| 40 | 2243.2 |
| 41 | 2236.9 |
| 42 | 2237.7 |
| 43 | 2244.4 |
| 44 | 2254.1 |
| 45 | 2254.8 |
| 46 | 2245.8 |
| 47 | 2245.9 |
| 48 | 2254.9 |
| 49 | 2254.3 |
| 50 | 2244.5 |
| 51 | 2237.8 |
| 52 | 2237 |
| 53 | 2243.3 |
| 54 | 2236.6 |
| 55 | 2239 |
| 56 | 2248.1 |
| 57 | 2244.5 |
| 58 | 2241.5 |
| 59 | 2240.5 |
| 60 | 2240.2 |
| 61 | 2242.4 |
| 62 | 2246.7 |
| 63 | 2242 |
| 64 | 2239.1 |
| 65 | 2238.2 |
| 66 | 2239.7 |
| 67 | 2243.5 |
| 68 | 2238.2 |

TABLE 1-continued

| Emitter Region # | Max Temp-2250 (with adjusted resistivity) |
|---|---|
| 69 | 2234.1 |
| 70 | 2231.4 |
| 71 | 2229.9 |
| 72 | 2228.5 |
| 73 | 2226.4 |
| 74 | 2224 |
| 75 | 2224.4 |
| 76 | 2220.1 |
| 77 | 2217.1 |
| 78 | 2214 |
| 79 | 2210.2 |
| 80 | 2204.6 |
| 81 | 2197 |
| 82 | 2187.5 |
| 83 | 2176.3 |
| 84 | 2164 |
| 85 | 2146.7 |
| 86 | 2123.1 |
| 87 | 2103.6 |
| 88 | 2080.1 |
| 89 | 2033.7 |
| 90 | 1970.5 |
| 91 | 1892.6 |
| 92 | 1788.3 |

Figure 5B:
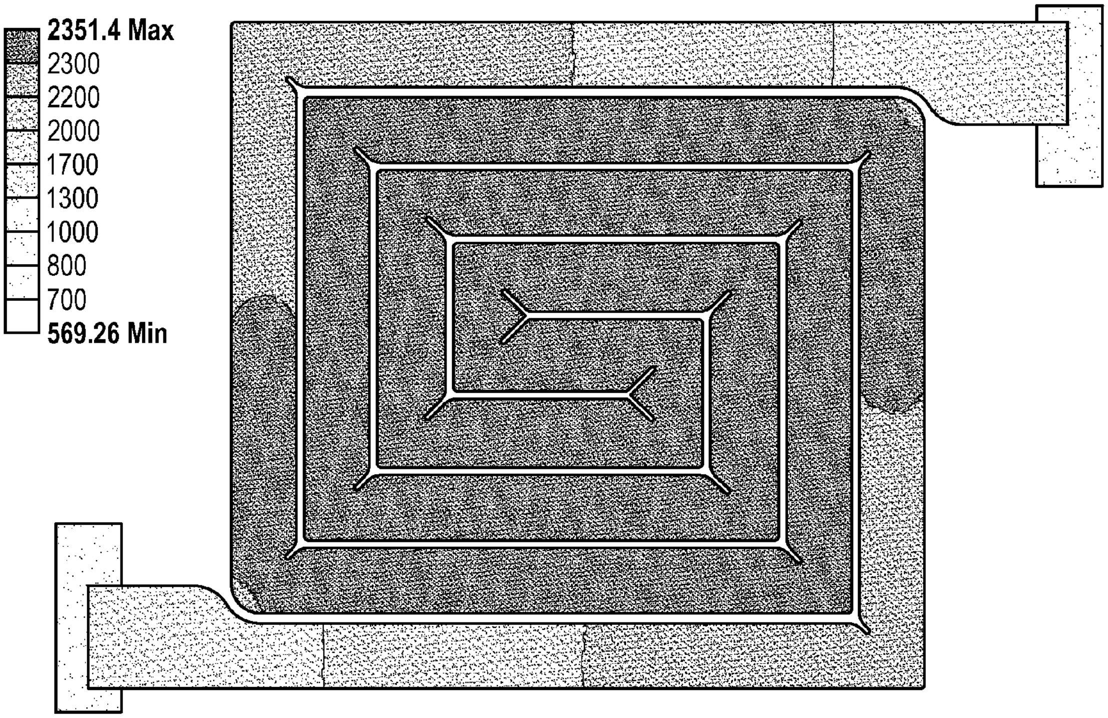

FIG. 5B illustrates an emitter temperature profile of the emitter of FIG. 4 for a maximum temperature (Tmax) being 2350 degrees C. with current being 8.25 A, voltage being 9.7 V, and input power being 80 W. Specific region temperatures in Celsius from region R1 to region R92 (see FIG. 3B for region designations) are shown in Table 2.

TABLE 2

| Emitter Region # | Max Temp-2350 (with adjusted resistivity) |
|---|---|
| 1 | 1871.1 |
| 2 | 1981.7 |
| 3 | 2063.1 |
| 4 | 2128.1 |
| 5 | 2175.1 |
| 6 | 2198.7 |
| 7 | 2218 |
| 8 | 2241.1 |
| 9 | 2257.6 |
| 10 | 2269.4 |
| 11 | 2280.1 |
| 12 | 2289.5 |
| 13 | 2297.1 |
| 14 | 2302.6 |
| 15 | 2306.4 |
| 16 | 2309.4 |
| 17 | 2312.5 |
| 18 | 2317.4 |
| 19 | 2316.4 |
| 20 | 2318.8 |
| 21 | 2321 |
| 22 | 2322.5 |
| 23 | 2324.1 |
| 24 | 2327.1 |
| 25 | 2331.7 |
| 26 | 2337.8 |
| 27 | 2333.3 |
| 28 | 2331.5 |
| 29 | 2332.6 |
| 30 | 2335.9 |
| 31 | 2341.4 |
| 32 | 2336.3 |
| 33 | 2333.8 |
| 34 | 2334.2 |
| 35 | 2335.3 |
| 36 | 2338.9 |
| 37 | 2343.2 |

TABLE 2-continued

| Emitter Region # | Max Temp-2350 (with adjusted resistivity) |
|---|---|
| 38 | 2332.6 |
| 39 | 2329.9 |
| 40 | 2337.7 |
| 41 | 2330.3 |
| 42 | 2331.1 |
| 43 | 2338.8 |
| 44 | 2350.1 |
| 45 | 2350.8 |
| 46 | 2340.3 |
| 47 | 2340.3 |
| 48 | 2350.9 |
| 49 | 2350.3 |
| 50 | 2339 |
| 51 | 2331.2 |
| 52 | 2330.4 |
| 53 | 2337.9 |
| 54 | 2330 |
| 55 | 2332.7 |
| 56 | 2343.3 |
| 57 | 2339 |
| 58 | 2335.4 |
| 59 | 2334.2 |
| 60 | 2333.9 |
| 61 | 2336.4 |
| 62 | 2341.4 |
| 63 | 2335.9 |
| 64 | 2332.6 |
| 65 | 2331.5 |
| 66 | 2333.4 |
| 67 | 2337.9 |
| 68 | 2331.8 |
| 69 | 2327.2 |
| 70 | 2324.2 |
| 71 | 2322.5 |
| 72 | 2321 |
| 73 | 2318.7 |
| 74 | 2316.3 |
| 75 | 2317.3 |
| 76 | 2312.5 |
| 77 | 2309.3 |
| 78 | 2306.3 |
| 79 | 2302.5 |
| 80 | 2297 |
| 81 | 2289.4 |
| 82 | 2280 |
| 83 | 2269.3 |
| 84 | 2257.5 |
| 85 | 2241 |
| 86 | 2217.9 |
| 87 | 2198.6 |
| 88 | 2175 |
| 89 | 2127.9 |
| 90 | 2063 |
| 91 | 1981.5 |
| 92 | 1870.8 |

Figure 6A:
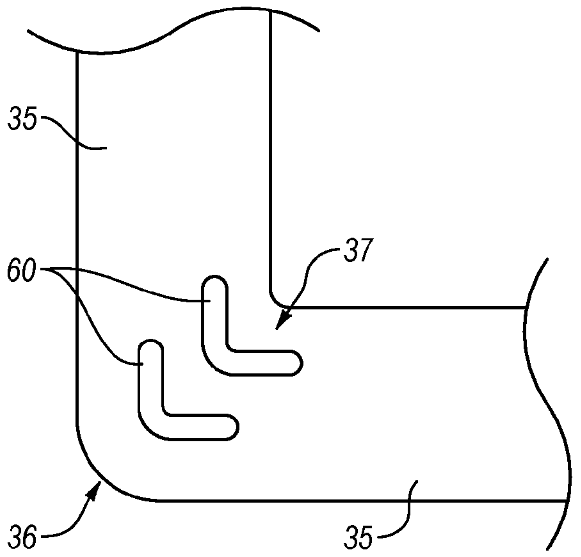
FIGS. 6A-6B are top views of embodiments of cutout portions in a planar electron emitter.

FIG. 6A shows a corner 36 having cutouts 60 at the location of the web 37. The cutouts 60 change the relative dimension of the web 37, which can be tuned in accordance with the rungs 35 adjacent to the corner. The dimension of these cutouts 60 can be used for resistance matching and modulation, where the size of the cutouts 60, or placement thereof, or number thereof (e.g., one, two, or three or more cutouts at a web 37) can be used to tune the resistivity of a run 35.

Figure 6B:
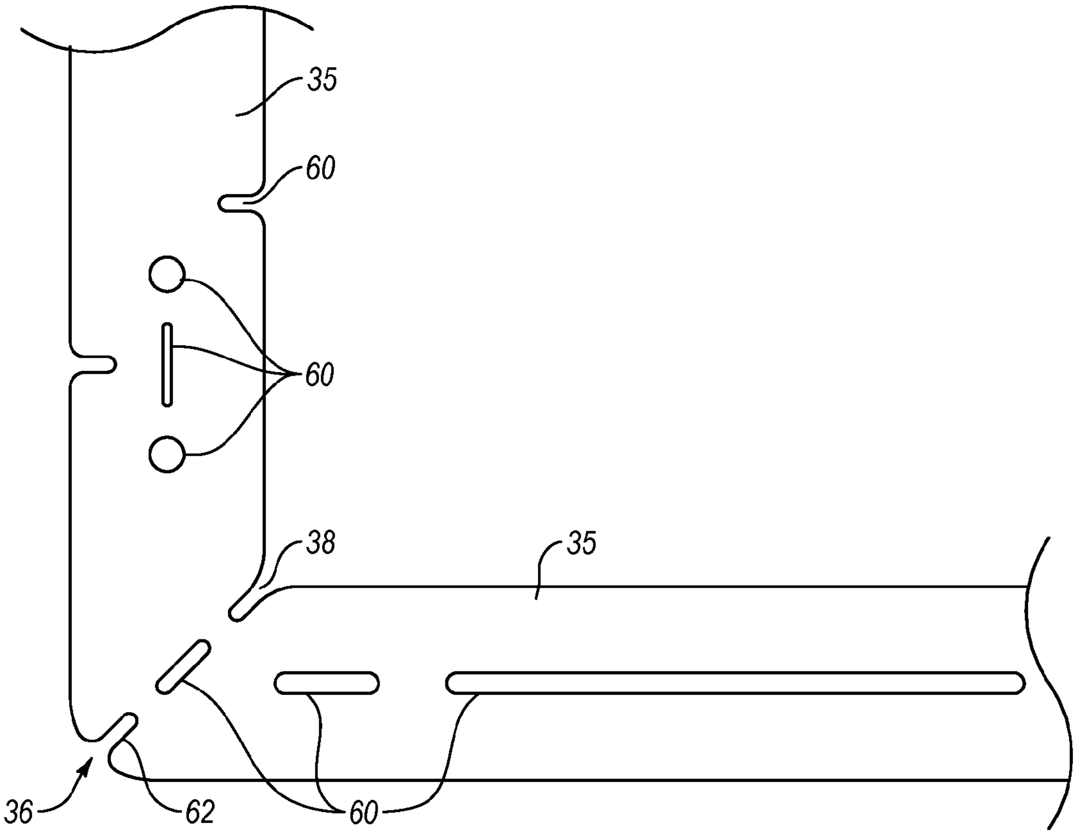

FIG. 6B shows the corner 30 having an apex slot 62 and a cutout 60, and shows the rungs 35 having various cutouts 60 in various shapes and dimensions. The cutouts of the rungs and at corners can vary. The cutouts can be uniform in dimension; however, they may also be non-uniform. The cutouts at a gap can also have non-uniform openings to the gap. A rung can also include a long, tapering cut running the length of the rung. Thus, the cutouts illustrated can be of any dimension relative to the rungs.

In one embodiment, an electron emitter can include: a plurality of elongate rungs connected together end to end from a first emitter end to a second emitter end in a plane so as to form a planar pattern, each elongate rung having a rung width dimension; a plurality of corners, wherein each elongate rung is connected to another elongate rung through a corner of the plurality of corners, each corner having a corner apex and an opposite corner nadir between the connected elongate rungs of the plurality of elongate rungs; a first gap between adjacent non-connected elongate rungs of the plurality of elongate rungs, wherein the first gap extends from the first emitter end to a middle rung; a second gap between adjacent non-connected elongate rungs of the plurality of elongate rungs, wherein the second gap extends from the second emitter end to the middle rung, wherein the first gap does not intersect the second gap; and one or more cutouts at one or more of the corners of the plurality of corners between the corner apex and corner nadir or at the corner nadir.

In one embodiment, one or more body portions of each corner between the corner apex and corner nadir, excluding the one or more cutouts, together define a web dimension between the corner apex and corner nadir, wherein the web dimension is within 10% of the rung width dimensions of the connected elongate rungs at the corner.

In one embodiment, from the first end to middle rung, the first gap has a plurality of first gap segments each having a gap segment width, each gap segment width having a dimension that maintains the first gap when the emitter is at a non-emitting temperature and at an electron emitting temperature, and wherein from the second end to middle rung, the second gap has a plurality of second gap segments each having a gap segment width, each gap segment width having a dimension that maintains the second gap when the emitter is at the non-emitting temperature and at the electron emitting temperature.

In one embodiment, the first gap is either clockwise or counter clockwise from the first and to the middle rung, and the second gap is the other of clockwise or counter clockwise from the middle rung to the second end so as to be the opposite orientation of the first gap.

In one embodiment, a first portion of the plurality of elongate rungs has a first rung width dimension and a second portion of the plurality of elongate rungs has at least a different second rung dimension.

In one embodiment, two or more of the first gap segments have different gap segment width dimensions, and two or more of the second gap segments have different gap segment width dimensions.

In one embodiment, first and second rungs from the first emitter end have a first rung width dimension, and other rungs from the second rung to the middle rung have at least one rung width dimension different from the first rung width dimension. Also, ultimate and penultimate rungs from the second emitter end have the first rung width dimension, and other rungs from the penultimate rung to the middle rung have at least one rung width dimension different from the first rung width dimension.

In one embodiment, each elongate rung of the plurality of elongate rungs has a flat surface that together the flat surfaces form a planar emitting surface in the form of the planar pattern.

In one embodiment, a first elongate leg can be coupled to a first elongate rung at the first end, and a second elongate leg can be coupled to an ultimate elongate rung at the second end. Also, the first elongate leg and second elongate leg can be at an angle relative to the planar emitting surface.

In one embodiment, the present technology can include a design protocol to design a planar emitter pattern, which design includes particular dimensions for the emitter pattern. The design can include the particular emitter pattern 30 shown in FIG. 3B. The design protocol can include determining a desired temperature profile or desired emission profile, and determining dimensions for particular rungs, webs, and/or gaps to achieve the desired profile. These determinations can be performed by a user inputting data input into a computing system and simulating a temperature profile on the computer based on the input. The designing of the dimensions can be performed on a computer, such as a CAD program, based on data input by a user into the computer. The design can then be simulated on a computer to determine whether or not the simulation produces the desired temperature profile. The simulation can be conducted based on instructions input into the computer by the user. The simulated temperature profile obtained by the computer can be indicative of the electron emission profile, which allows for computer CAD design and temperature simulation. Once a desired temperature profile can be designed and simulated on the computer by the user, a real electron emitter can be manufactured and tested for the real temperature profile and/or electron emission profile. Once tested, the data for the real emitter can then be input by the user into the computer and used to modulate dimensions of the rungs, webs, and/or gaps in another computer CAD model, and then the new emitter design can be simulated on the computer, and then manufactured and tested. The CAD design operated by the user based on user input into the computer can include: determining a rung dimension for each rung; determining a web dimension for each web; and determining a gap dimension for each gap. Here, one or more of these different features can have the same dimension, and one or more of the same features can have different dimensions. That is, some rungs can have the same dimension and some can have different dimensions, some gaps can have the same dimension and some can have different dimensions, and some webs can have the same dimension and some can have different dimensions.

An example of a design method can include the following steps of a design protocol to design a planar emitter. Any of these steps can be implemented by a user inputting data input into the computer and inputting instructions into the computer to cause the computer to perform computational calculations and simulations. In a first step, a particular application for an X-ray is determined. The particular application that is determined can result in a particular X-ray emission pattern or focal spot shape or number of focal spots to be identified. As such, the desired emission profile is determined based on the particular application. In a second step, an initial pattern shape for the emitter pattern can be determined. Here, the pattern shape can be the emitter pattern that is illustrated herein, which includes a number of rungs connected together at 90 degree corners to start from a first end and end at a second end, where each corner can have a web. In a third step, the desired emission profile can be matched or overlaid on the emitter pattern so that the rungs to be configured for electron emission match the emission profile and so that the rungs to be configured to have a reduced emission or no emission can match the areas of no emission in the emission profile. In the fourth step, the rungs to emit electrons for the emission profile can be identified, and rungs to not emit substantial electrons can be identified. This results in general primer for the dimensions of the emitter pattern. In a fifth step, the length and width dimensions of each of the rungs can be determined to match the emitter pattern to the emission profile. In a sixth step, the gap dimensions can be determined for each gap between rungs, which dimensions can be determined in view of the thermal expansion coefficient so that the gaps exist while cool and while fully heated and emitting electrons. In a seventh step, the emitter pattern having the rung and gap dimensions can be overlaid or otherwise compared with the desired emission profile, and any adjustments can be made so that the emitter pattern is capable of emitting the emission profile. In an eighth step, the web dimensions can be determined to correspond with the rung widths in order to obtain a rung temperature potential. The web dimensions are often adjusted to be about the dimension of the rung width, such as within 1%, 2%, or up to 5% or up to 10%. Based on the outcome from these steps, the planar emitter profile can be designed with the appropriate dimensions on a computer-assisted design program on a computer. The planar emitter pattern with dimensions can be saved as data in a database on a data storage medium of the computer. However, any of these steps may be optional.

Once designed, the planar emitter pattern with dimensions can be processed through a simulation protocol on a computer. Such processing can be implemented by a user inputting parameters and input into the computer. The simulation protocol can be part of the design method. The simulation can simulate the temperature for each of the rugs based on the planar emitter pattern with one or more electrical current profiles, which can be input into the computer. That is, the electrical current that is passed through the planar emitter can be simulated with various parameters that can be varied. Accordingly, the planar emitter pattern can be simulated with one or more electrical current profiles to determine the temperature profile for the entire emitter, each rung, and regions (e.g., see FIG. 3B and Tables 1 and 2). The temperature profile for the entire emitter, each rung, and/or regions can be saved as data in a database on the computer.

Once one or more temperature profiles for the emitter are determined from the simulation, an iteration protocol can be performed on the computer based on input from the user so that any of the dimensions of any of the webs, rung widths, and/or gap dimensions can be modulated in a manner so that the iterative emitter pattern is likely to provide a temperature profile that matches the desired temperature profile. The iteration protocol can include the design protocol and simulation protocol, which iteration protocol can be repeated by the user with the computer until the emitter pattern provides a suitable temperature profile.

Once the emitter pattern is simulated to provide a suitable temperature profile, a physical planar electron emitter can be fabricated to include the emitter pattern and appropriate dimensions for the webs, rung widths, and/or gaps. The fabrication can be part of a method of manufacture. Generally, a piece of flat material having an appropriate thickness (e.g., height) can be laser-cut into the emitter pattern having the appropriate dimensions for the webs, rung widths, and gaps.

Once the physical emitter has been manufactured, it can be tested with one or more electrical currents in order to determine the temperature profile for each of the temperatures. The real temperature profile that is measured can identify the temperature for the entire emitter, each rung, and/or regions. The real temperature profile for the entire emitter, each rung, and/or regions for one or more current profiles can be input into the computer based on instructions obtained by the user and saved as data in a database on the computer. This temperature data can be linked with the emitter pattern and dimension data so that the emitter pattern and dimensions can be recalled when the corresponding temperature profile is desired. That is, a user can input instructions into the computer in order to obtain the emitter pattern and dimension data from the database. Thus, the database can include a plurality of emitter pattern and dimension designs linked to the temperature profiles for one or more current profiles. This allows a temperature profile to be selected by the user based on input from the user into the computer, and then the emitter pattern and dimensions for that temperature profile to be obtained from the database and provided to the user.

The database can serve as a repository of temperature profiles and corresponding emitter patterns and dimensions. This allows for the design of a certain emitter pattern for a temperature profile to start with an emitter pattern design with a known temperature profile, and then the parameters can be varied in a manner to iterate toward the desired temperature profile. If a desired temperature profile has already been determined, then the corresponding emitter pattern and dimensions can be selected from the database by the user.

In one embodiment, a method of manufacturing a planar electron emitter can include: obtaining a designed pattern, which can be computer designed and simulated; obtaining a sheet of material; and laser cutting the emitter pattern into the sheet. The legs can then be bent from the planar emitter pattern. In one example, once the shape of the pattern has been made, it can be recrystallized and set.

In one embodiment, a method of designing an electron emitter can include: determining a desired cross-sectional profile of an electron emission from an electron emitter, where the parameters of the electron emitter can be input into a computer; determining a desired temperature profile for the electron emitter that emits the desired cross-sectional profile; and determining desired emitter dimensions for a defined electrical current through the electron emitter that produces the desired temperature profile, which can be determined through simulations run on the computer under instructions input by the user. The emitter dimensions can include: each rung width dimension; each first gap segment dimension; each second gap segment dimension; and each web dimension. The electron emitter can include: a plurality of elongate rungs connected together end to end at corners, each corner having a corner apex and an opposite corner nadir, each elongate rung having a rung width dimension; a first gap between adjacent non-connected elongate rungs from the first emitter end to a middle rung, the first gap including a plurality of first gap segments each having a first gap segment width; a second gap between adjacent non-connected elongate rungs from the second emitter end to the middle rung, the second gap including a plurality of second gap segments each having a second gap segment width; and one or more body portions of each corner between the corner apex and corner nadir together define a web dimension for each corner.

In one embodiment, the method can include: inputting an emitter pattern of the electron emitter into a computer by the user, the emitter pattern including the emitter dimensions; simulating the temperature profile of the emitter pattern on the computer for the defined current based on input from the user; and determining whether the emitter pattern has the desired temperature profile for the defined electrical current.

In one embodiment, the method can include: (a) changing one or more of the emitter dimensions in the computer by the user to obtain an iterative emitter pattern having iterative emitter dimensions; and (b) simulating the temperature profile of the iterative emitter pattern on the computer for the defined current based on input from the user; and (c) determining whether the iterative emitter pattern has the desired temperature profile for the defined electrical current, if not, then repeating (a) through (c).

In one embodiment, the method can include: setting the web rung dimensions to correspond with an emitter pattern; and varying the web dimensions to obtain the desired temperature profile. These actions can be performed with the computer based on input into the computer by the user.

In one embodiment, the method can include: setting the web rung dimensions to correspond with an emitter pattern; varying the web dimensions to obtain a first temperature profile that is different from the desired temperature profile; and varying the rung width dimensions after varying the web dimensions to obtain the desired temperature profile. These actions can be performed with the computer based on input into the computer by the user.

In one embodiment, the method can include: setting emitter dimensions for each rung width dimension, each first gap segment dimension, and each second gap segment dimension; and varying each web dimension to obtain the desired temperature profile. These actions can be performed with the computer based on input into the computer by the user.

In one embodiment, the method can include: obtaining a simulated temperature profile that corresponds to the desired temperature profile; manufacturing a physical electron emitter having the emitter pattern that produced the simulated temperature profile; testing the physical electron emitter with a defined electrical current; and measuring the temperature profile of the physical electron emitter.

In one embodiment, when the temperature profile of the physical electron emitter matches the desired temperature profile, the physical electron emitter is implemented in an X-ray tube. Alternatively, when the temperature profile of the physical electron emitter does not match the desired temperature profile, the method further comprises: (a) changing one or more of the emitter dimensions to obtain an iterative emitter pattern having iterative emitter dimensions; and (b) simulating the temperature profile of the iterative emitter pattern on the computer for the defined current; and (c) determining whether the iterative emitter pattern has the desired temperature profile for the defined electrical current, if not, then repeating (a) through (c). The changes and simulation can be based on input into the computer by the user.

In one embodiment, the method can include: obtaining a plurality of temperature points of the desired temperature profile, and entering the data thereof into the computer system by the user; simulating the temperature profile of the emitter pattern on the computer for the defined current to obtain a plurality of simulated temperature points of the simulated temperature profile, which can be performed based on input into the computer by the user; comparing the plurality of temperature points with the plurality of simulated temperature points; and selecting the emitter pattern when the plurality of temperature points substantially match the plurality of simulated temperature points.

In one embodiment, a method of manufacturing an electron emitter can include: obtaining a sheet of electron emitter material; obtaining an electron emitter pattern; and laser cutting the electron emitter pattern into the electron emitter material. The electron emitter pattern can include: a plurality of elongate rungs connected together end to end from a first emitter end to a second emitter end in a plane so as to form a planar pattern, each elongate rung having a rung width dimension; a plurality of corners, wherein each elongate rung is connected to another elongate rung through a corner of the plurality of corners, each corner having a corner apex and an opposite corner nadir between the connected elongate rungs of the plurality of elongate rungs; a first gap between adjacent non-connected elongate rungs of the plurality of elongate rungs, wherein the first gap extends from the first emitter end to a middle rung; a second gap between adjacent non-connected elongate rungs of the plurality of elongate rungs, wherein the second gap extends from the second emitter end to the middle rung, wherein the first gap does not intersect the second gap; and one or more cutouts at one or more of the corners of the plurality of corners between the corner apex and corner nadir or at the corner nadir. In one aspect, the method can further include determining that the electron emitter pattern produces a desired temperature profile for a defined electrical current.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An electron emitter comprising:

a plurality of elongate rungs connected together end to end from a first emitter end to a second emitter end in a plane so as to form a planar pattern;

a plurality of corners, wherein each elongate rung is connected to another elongate rung through a corner of the plurality of corners, each corner having a corner apex and an opposite corner nadir between the connected elongate rungs of the plurality of elongate rungs;

a first gap between adjacent non-connected elongate rungs of the plurality of elongate rungs, wherein the first gap extends from the first emitter end to a middle rung;

a second gap between adjacent non-connected elongate rungs of the plurality of elongate rungs, wherein the second gap extends from the second emitter end to the middle rung, wherein the first gap does not intersect the second gap; and one or more cutouts at one or more of the corners of the plurality of corners between the corner apex and corner nadir or at the corner nadir.

2. The emitter of claim 1, wherein one or more body portions of each corner between the corner apex and corner nadir, excluding the one or more cutouts, together define a web dimension, each elongate rung having a rung width dimension, wherein the web dimension is within 10% of the rung width dimensions of the connected elongate rungs at the corner.

3. The emitter of claim 1, wherein from the first end to middle rung, the first gap has a plurality of first gap segments each having a gap segment width, each gap segment width having a dimension that maintains the first gap when the emitter is at a non-emitting temperature and at an electron emitting temperature, and wherein from the second end to middle rung, the second gap has a plurality of second gap segments each having a gap segment width, each gap segment width having a dimension that maintains the second gap when the emitter is at the non-emitting temperature and at the electron emitting temperature.

4. The emitter of claim 1, wherein the first gap is either clockwise or counter clockwise from the first end to the middle rung, and the second gap is the other of clockwise or counter clockwise from the middle rung to the second end so as to be the opposite orientation of the first gap.

5. The emitter of claim 1, wherein a first portion of the plurality of elongate rungs has a first rung width dimension and a second portion of the plurality of elongate rungs has a different second rung dimension.

6. The emitter of claim 3, wherein two or more of the first gap segments have different gap segment width dimensions, and two or more of the second gap segments have different gap segment width dimensions.

7. The emitter of claim 1, wherein first and second rungs from the first emitter end have a first rung width dimension, and other rungs from the second rung to the middle rung have at least one rung width dimension that is different from the first rung width dimension, and wherein ultimate and penultimate rungs from the second emitter end have the first rung width dimension, and other rungs from the penultimate rung to the middle rung have at least one rung width dimension different from the first rung width dimension.

8. The emitter of claim 1, each elongate rung of the plurality of elongate rungs having a flat surface that together the flat surfaces form a planar emitting surface in the form of the planar pattern.

9. The emitter of claim 8, comprising a first elongate leg coupled to a first elongate rung at the first end and a second elongate leg coupled to an ultimate elongate rung at the second end, the first elongate leg and second elongate leg being at an angle relative to the planar emitting surface.

10. A method of inhomogeneously emitting electrons from an electron emitter, the method comprising:

providing the electron emitter of claim 1 having a planar emitter surface formed by the plurality of elongate rungs; and emitting an inhomogeneous electron beam from the planar emitter surface in a perpendicular direction.

11. A method of manufacturing an electron emitter, the method comprising:

obtaining a sheet of electron emitter material;

obtaining an electron emitter pattern; and laser cutting the electron emitter pattern into the electron emitter material, the electron emitter pattern including:

a plurality of elongate rungs connected together end to end from a first emitter end to a second emitter end in a plane so as to form a planar pattern;

a plurality of corners, wherein each elongate rung is connected to another elongate rung through a corner of the plurality of corners, each corner having a corner apex and an opposite corner nadir between the connected elongate rungs of the plurality of elongate rungs;

a first gap between adjacent non-connected elongate rungs of the plurality of elongate rungs, wherein the first gap extends from the first emitter end to a middle rung;

a second gap between adjacent non-connected elongate rungs of the plurality of elongate rungs, wherein the second gap extends from the second emitter end to the middle rung, wherein the first gap does not intersect the second gap; and one or more cutouts at one or more of the corners of the plurality of corners between the corner apex and corner nadir or at the corner nadir.

12. The method of claim 11, further comprising:

determining that the electron emitter pattern produces a desired temperature profile for a defined electrical current.

* * * * *